(12) United States Patent
Allen et al.

(10) Patent No.: US 9,339,874 B2
(45) Date of Patent: May 17, 2016

(54) CUTTING TOOL

(71) Applicant: Milwaukee Electric Tool Corporation, Brookfield, WI (US)

(72) Inventors: Douglas Allen, Winton, CA (US); Richard Hohnl, Jr., Racine, WI (US); Jeffrey M. Zeiler, Pewaukee, WI (US); David B. Griep, Rubicon, WI (US); Mark D. Willer, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 586 days.

(21) Appl. No.: 13/750,306

(22) Filed: Jan. 25, 2013

(65) Prior Publication Data
US 2013/0136553 A1 May 30, 2013

Related U.S. Application Data

(63) Continuation of application No. 12/869,831, filed on Aug. 27, 2010, now Pat. No. 8,371,777, which is a continuation of application No. 12/264,960, filed on Nov. 5, 2008, now Pat. No. 8,328,477, and a
(Continued)

(51) Int. Cl.
| | |
|---|---|
| *B23B 51/00* | (2006.01) |
| *B27G 15/00* | (2006.01) |
| *B23B 51/04* | (2006.01) |

(52) U.S. Cl.
CPC .............. *B23B 51/00* (2013.01); *B23B 51/0413* (2013.01); *B23B 51/0433* (2013.01);
(Continued)

(58) Field of Classification Search
CPC ............ Y10T 408/902; Y10T 408/901; Y10T 408/90; Y10T 408/905; Y10T 408/906; Y10T 408/9065; Y10T 408/88; Y10T 408/909; Y10T 408/9098; Y10T 408/90993; B27G 15/00; B27G 15/02; B23B 2251/18; B23B 2251/50; B23B 2251/60

USPC ......................................................... 408/214
See application file for complete search history.

(56) References Cited

U.S. PATENT DOCUMENTS

| 12,551 A | 3/1855 | Hoagland |
| 14,752 A | 4/1856 | Curtiss |

(Continued)

FOREIGN PATENT DOCUMENTS

| CA | 2097971 | 12/1994 |
| CA | 2313749 | 9/2001 |

(Continued)

OTHER PUBLICATIONS

International Search Report and Written Opinion for Application No. PCT/US2014/014249 dated May 13, 2014 (13 pages).

(Continued)

*Primary Examiner* — Daniel Howell
(74) *Attorney, Agent, or Firm* — Michael Best & Friedrich LLP

(57) ABSTRACT

A cutting tool including a body, a blade, a feed shaft, and a locking member. The body defines an axis and is adapted to be received by a spindle of a power tool. The blade is removably supportable on the body and rotatable about the axis for cutting a workpiece. A feed shaft is removably supportable in the body and rotatable about the axis for engaging a workpiece, the feed shaft being mountable in the cutting tool to engage and at least partially restrain the blade. The feed shaft further includes an opening transverse to the axis. The locking member is engageable with the body and with the opening in the feed shaft. Advancement of the locking member into the opening tightens both the blade and the feed shaft to the body.

14 Claims, 35 Drawing Sheets

Related U.S. Application Data continuation-in-part of application No. 11/681,546, filed on Mar. 2, 2007, now Pat. No. 7,625,160, said application No. 12/264,960 is a continuation-in-part of application No. 11/681,553, filed on Mar. 2, 2007, now Pat. No. 7,661,911.

(60) Provisional application No. 61/001,837, filed on Nov. 5, 2007, provisional application No. 60/778,287, filed on Mar. 2, 2006, provisional application No. 60/786,654, filed on Mar. 28, 2006.

(52) U.S. Cl.
CPC ............ *B23B51/0473* (2013.01); *B27G 15/00* (2013.01); *B23B 2251/50* (2013.01); *B23B 2251/60* (2013.01); *Y10T 29/49826* (2015.01); *Y10T 408/03* (2015.01); *Y10T 408/892* (2015.01); *Y10T 408/8923* (2015.01); *Y10T 408/8967* (2015.01); *Y10T 408/901* (2015.01); *Y10T 408/902* (2015.01); *Y10T 408/907* (2015.01); *Y10T 408/9098* (2015.01); *Y10T 408/90993* (2015.01)

(56) References Cited

U.S. PATENT DOCUMENTS

| | | |
|---|---|---|
| 20,192 A | 5/1858 | Clark |
| 22,195 A | 11/1858 | Norris |
| 22,394 A | 12/1858 | White et al. |
| 29,883 A | 9/1860 | Hathaway |
| 73,162 A | 1/1868 | Brush |
| 79,181 A | 6/1868 | Andrews |
| 82,956 A | 10/1868 | Ives |
| 90,755 A | 6/1869 | Ives |
| 95,379 A | 9/1869 | Richardson |
| 111,099 A | 1/1871 | Walch |
| 124,089 A | 2/1872 | Shepardson |
| RE5,238 E | 1/1873 | Walch |
| 158,090 A | 12/1874 | King |
| 166,378 A | 8/1875 | Higgins |
| 205,218 A | 6/1878 | Stearns |
| 215,744 A | 5/1879 | Heyn |
| 216,023 A | 6/1879 | Crane |
| 221,391 A | 11/1879 | Brinton |
| 285,440 A | 9/1883 | Swan |
| 329,660 A | 11/1885 | Lord |
| 371,954 A | 10/1887 | Larger |
| 399,595 A | 3/1889 | Wyckoff |
| 444,956 A | 1/1891 | Jones |
| 450,908 A | 4/1891 | Brede et al. |
| 458,640 A | 9/1891 | Phillips |
| 469,901 A | 3/1892 | Webb |
| 529,832 A | 11/1894 | Phillips |
| 532,823 A | 2/1895 | Sanger |
| 548,385 A | 10/1895 | Nelson |
| 565,500 A | 8/1896 | Pearl |
| 567,271 A | 9/1896 | Howard, Jr. et al. |
| 632,560 A | 9/1899 | Furbish |
| 646,439 A | 4/1900 | Lavigne |
| 654,861 A | 7/1900 | Tynan |
| 778,845 A | 1/1905 | Cox |
| 787,664 A | 4/1905 | Converse |
| 788,941 A | 5/1905 | Pearl |
| 808,245 A | 12/1905 | Lund |
| 811,351 A | 1/1906 | Wyckoff |
| 835,125 A | 11/1906 | Webb |
| 836,212 A | 11/1906 | Pierce |
| 877,831 A | 1/1908 | Creedon |
| 897,041 A | 8/1908 | Weller |
| 961,770 A | 6/1910 | Grandperrin |
| 967,789 A | 8/1910 | La Baron |
| 1,008,363 A | 11/1911 | Pica |
| 1,037,616 A | 9/1912 | Grissom |
| 1,047,466 A | 12/1912 | Wagner |
| 1,066,707 A | 7/1913 | Caldwell |
| 1,104,987 A | 7/1914 | Grimes |
| 1,140,988 A | 5/1915 | Kunitz |
| 1,185,380 A | 5/1916 | Davis |
| 1,275,889 A | 8/1918 | Flander |
| 1,281,813 A | 10/1918 | Nadolney |
| 1,389,578 A | 9/1921 | Charlton |
| 1,415,317 A | 5/1922 | Crawford et al. |
| 1,479,306 A | 1/1924 | Leger |
| 1,515,548 A | 11/1924 | Cerotsky |
| 1,787,229 A | 12/1930 | Zimmerman |
| 1,955,768 A | 4/1934 | Powell |
| 2,172,070 A | 9/1939 | Palmgren |
| 2,179,070 A | 11/1939 | Weise |
| 2,237,901 A | 4/1941 | Chun |
| 2,283,514 A * | 5/1942 | Stanworth ...................... 279/83 |
| 2,577,987 A | 12/1951 | Wilson |
| 2,593,823 A | 4/1952 | Wilson |
| 2,618,304 A | 11/1952 | Wilson |
| 2,621,548 A | 12/1952 | Williams |
| 2,679,770 A | 6/1954 | Carter et al. |
| 2,779,361 A | 1/1957 | McKiff |
| 2,794,469 A | 6/1957 | Shortell |
| 2,812,791 A | 11/1957 | Mackey |
| 2,835,293 A | 5/1958 | Mackey |
| 2,883,888 A | 4/1959 | Stewart |
| 3,165,131 A | 1/1965 | Mackay |
| 3,175,630 A | 3/1965 | Hein et al. |
| 3,262,474 A | 7/1966 | Enders |
| 3,267,975 A | 8/1966 | Enders |
| 3,390,596 A | 7/1968 | Trevathan |
| 3,554,192 A | 1/1971 | Isberner |
| 3,609,056 A | 9/1971 | Hougen |
| 3,610,768 A | 10/1971 | Cochran |
| 3,648,508 A | 3/1972 | Hougen |
| 3,655,244 A | 4/1972 | Swisher |
| 3,667,768 A | 6/1972 | Stokey |
| 3,687,565 A | 8/1972 | Byers et al. |
| 3,945,753 A | 3/1976 | Byers et al. |
| D239,519 S | 4/1976 | Townsend |
| RE28,900 E | 7/1976 | Byers et al. |
| 4,050,840 A | 9/1977 | Skingle |
| 4,050,841 A | 9/1977 | Hildebrandt |
| 4,079,766 A | 3/1978 | Conley et al. |
| 4,090,807 A | 5/1978 | Stewart |
| 4,095,491 A | 6/1978 | Hildebrandt |
| 4,239,427 A | 12/1980 | Walton, II |
| 4,244,667 A | 1/1981 | Timmons |
| 4,367,991 A | 1/1983 | Grafe et al. |
| 4,406,334 A | 9/1983 | Baumann et al. |
| 4,419,032 A | 12/1983 | Flowers |
| 4,536,107 A | 8/1985 | Sandy et al. |
| 4,589,807 A | 5/1986 | Martin |
| 4,604,005 A | 8/1986 | Russ |
| 4,625,593 A | 12/1986 | Schmotzer |
| 4,752,161 A | 6/1988 | Hill |
| 4,768,901 A | 9/1988 | Reinauer et al. |
| 4,773,354 A | 9/1988 | Wilbur |
| D298,633 S | 11/1988 | Kenemore |
| 4,830,548 A | 5/1989 | Kandarian |
| 4,841,824 A | 6/1989 | Hartmann et al. |
| 4,900,202 A | 2/1990 | Wienhold |
| 4,968,193 A | 11/1990 | Chaconas et al. |
| 4,976,175 A | 12/1990 | Hung |
| 5,011,344 A | 4/1991 | Johnson |
| 5,013,194 A | 5/1991 | Wienhold |
| 5,022,131 A | 6/1991 | Hobbs |
| 5,065,498 A | 11/1991 | McKenzie |
| 5,092,719 A | 3/1992 | Zsiger |
| 5,098,234 A | 3/1992 | Judkins et al. |
| 5,193,951 A | 3/1993 | Schimke |
| 5,228,812 A | 7/1993 | Noguchi et al. |
| D338,607 S | 8/1993 | Anderson |
| 5,244,319 A | 9/1993 | Cochran |
| 5,288,183 A | 2/1994 | Chaconas et al. |
| 5,302,060 A | 4/1994 | Nyström et al. |
| D347,150 S | 5/1994 | Falconbridge |
| 5,346,453 A | 9/1994 | Rivera-Bottzeck |
| 5,358,361 A | 10/1994 | Jurski |

(56) References Cited

U.S. PATENT DOCUMENTS

| | | |
|---|---|---|
| 5,376,092 A | 12/1994 | Hein et al. |
| 5,423,640 A | 6/1995 | Lindblom et al. |
| 5,474,407 A | 12/1995 | Rodel et al. |
| 5,570,978 A | 11/1996 | Rees et al. |
| 5,586,847 A | 12/1996 | Mattern, Jr. et al. |
| 5,597,275 A | 1/1997 | Hogan |
| 5,607,263 A | 3/1997 | Nespeta et al. |
| 5,630,478 A | 5/1997 | Schimke |
| 5,649,794 A | 7/1997 | Kress et al. |
| 5,695,304 A | 12/1997 | Ebert |
| D392,297 S | 3/1998 | Brutscher |
| 5,733,076 A | 3/1998 | Basteck |
| 5,803,677 A | 9/1998 | Brutscher et al. |
| 5,807,039 A | 9/1998 | Booher et al. |
| 5,810,517 A | 9/1998 | Bostic |
| 5,813,802 A | 9/1998 | Ajimi et al. |
| 5,820,319 A | 10/1998 | Hull et al. |
| 5,829,540 A | 11/1998 | Peay et al. |
| 5,865,571 A | 2/1999 | Tankala et al. |
| 5,893,685 A | 4/1999 | Olson et al. |
| 5,895,179 A | 4/1999 | Gschwend et al. |
| 5,934,843 A | 8/1999 | Brask et al. |
| 5,971,674 A | 10/1999 | Holley |
| D416,567 S | 11/1999 | Vogelsanger |
| 5,975,814 A | 11/1999 | Pomp |
| 6,007,277 A | 12/1999 | Olson et al. |
| 6,024,520 A | 2/2000 | Haughton et al. |
| D422,459 S | 4/2000 | Webb et al. |
| 6,045,302 A | 4/2000 | Orr |
| 6,053,675 A | 4/2000 | Holland et al. |
| 6,073,710 A | 6/2000 | Popp et al. |
| 6,089,337 A | 7/2000 | Kleine et al. |
| 6,109,841 A | 8/2000 | Johne |
| 6,158,304 A | 12/2000 | Packer et al. |
| 6,179,718 B1 | 1/2001 | Morath et al. |
| D438,219 S | 2/2001 | Brutscher |
| 6,199,872 B1 | 3/2001 | Hasan |
| 6,213,232 B1 | 4/2001 | Peetz |
| 6,261,033 B1 | 7/2001 | Thames et al. |
| 6,270,297 B1 | 8/2001 | Fang et al. |
| 6,302,408 B1 | 10/2001 | Zierpka |
| 6,347,914 B1 | 2/2002 | Boyle et al. |
| 6,354,177 B2 | 3/2002 | Peters |
| 6,354,773 B1 | 3/2002 | Konen |
| 6,354,774 B1 | 3/2002 | Haughton et al. |
| 6,361,255 B1 | 3/2002 | Schmotzer |
| 6,394,714 B2 | 5/2002 | Eberhard |
| 6,394,715 B1 | 5/2002 | Boyle et al. |
| D459,741 S | 7/2002 | Erickson |
| 6,457,916 B2 | 10/2002 | Wienhold |
| 6,481,938 B2 | 11/2002 | Widin |
| 6,488,452 B1 | 12/2002 | Hoskins et al. |
| 6,499,919 B2 | 12/2002 | Feld |
| 6,502,484 B2 | 1/2003 | Pao-His |
| 6,511,268 B1 | 1/2003 | Vasudeva et al. |
| 6,543,789 B2 | 4/2003 | Frenzel et al. |
| 6,543,959 B1 | 4/2003 | Jore |
| 6,561,523 B1 | 5/2003 | Wienhold |
| 6,568,876 B2 | 5/2003 | Augustin |
| 6,582,164 B1 | 6/2003 | McCormick |
| 6,599,063 B1 | 7/2003 | Capstran |
| 6,612,788 B2 | 9/2003 | Thomas et al. |
| 6,652,202 B2 | 11/2003 | Remke et al. |
| 6,659,473 B2 | 12/2003 | Below et al. |
| 6,695,321 B2 | 2/2004 | Bedi et al. |
| 6,702,529 B1 | 3/2004 | Tagstrom et al. |
| 6,705,807 B1 | 3/2004 | Rudolph et al. |
| 6,722,667 B2 | 4/2004 | Cantion |
| 6,817,429 B2 | 11/2004 | Sollami |
| 6,874,978 B2 | 4/2005 | Gongola |
| 6,890,133 B2 | 5/2005 | Singh et al. |
| 6,929,434 B2 | 8/2005 | Prokop |
| D509,519 S | 9/2005 | Sollami |
| 6,959,631 B2 | 11/2005 | Sako |
| 6,968,912 B2 | 11/2005 | Sollami et al. |
| D513,273 S | 12/2005 | Sollami |
| D515,115 S | 2/2006 | Sollami |
| 7,000,509 B2 | 2/2006 | Shiao |
| 7,028,593 B1 | 4/2006 | Lin et al. |
| D522,339 S | 6/2006 | Kimura |
| 7,086,314 B2 | 8/2006 | Wannop |
| 7,100,714 B1 | 9/2006 | Sollami |
| 7,134,368 B2 | 11/2006 | Nagy |
| 7,168,511 B2 | 1/2007 | Woods et al. |
| 7,225,890 B2 | 6/2007 | Meierhofer et al. |
| 7,237,458 B2 | 7/2007 | Shiao |
| 7,246,975 B2 | 7/2007 | Corso et al. |
| D551,269 S | 9/2007 | Burke, III |
| 7,264,427 B1 | 9/2007 | Kunz-Mujica |
| 7,331,096 B2 | 2/2008 | Kugler et al. |
| D575,808 S | 8/2008 | Zeiler et al. |
| 7,544,026 B2 | 6/2009 | Durfee |
| D605,672 S | 12/2009 | Allen et al. |
| 7,625,160 B2 | 12/2009 | Zeiler et al. |
| 7,661,911 B2 | 2/2010 | Zeiler et al. |
| 7,909,547 B2 | 3/2011 | Jordan et al. |
| 8,007,424 B2 | 8/2011 | Moser et al. |
| 8,057,135 B2 | 11/2011 | Nordlin et al. |
| 8,070,397 B2 | 12/2011 | Durfee |
| 8,070,398 B2 | 12/2011 | Durfee |
| 8,109,700 B2 | 2/2012 | Jordan et al. |
| 8,113,749 B2 | 2/2012 | Dost et al. |
| 8,328,477 B2 * | 12/2012 | Allen et al. .................. 408/213 |
| 8,371,777 B2 * | 2/2013 | Allen et al. .................. 408/213 |
| 2001/0013430 A1 | 8/2001 | Hauptmann et al. |
| 2001/0019687 A1 | 9/2001 | Eberhard |
| 2002/0041798 A1 | 4/2002 | Karlsson |
| 2002/0081165 A1 | 6/2002 | Hecht |
| 2002/0106254 A1 | 8/2002 | Rudolph |
| 2002/0141838 A1 | 10/2002 | Thomas et al. |
| 2002/0182021 A1 | 12/2002 | Hsieh |
| 2003/0068208 A1 | 4/2003 | Eberhard |
| 2003/0103822 A1 | 6/2003 | Wirth et al. |
| 2003/0180108 A1 | 9/2003 | Gongola |
| 2003/0219321 A1 | 11/2003 | Borchert et al. |
| 2003/0230862 A1 | 12/2003 | Peters et al. |
| 2004/0042861 A1 | 3/2004 | Capstran |
| 2004/0101376 A1 | 5/2004 | Shemeta |
| 2004/0101379 A1 | 5/2004 | Mabuchi et al. |
| 2004/0175244 A1 | 9/2004 | Otten |
| 2004/0179912 A1 | 9/2004 | Quanz |
| 2004/0265080 A1 | 12/2004 | Danielsson et al. |
| 2005/0025594 A1 | 2/2005 | Lindblom |
| 2005/0105981 A1 | 5/2005 | Byrley et al. |
| 2005/0135887 A1 | 6/2005 | Borchert et al. |
| 2005/0249562 A1 | 11/2005 | Frejd |
| 2005/0249563 A1 | 11/2005 | Scott et al. |
| 2006/0053986 A1 | 3/2006 | Ward |
| 2007/0172325 A1 | 7/2007 | Ebert |
| 2007/0212179 A1 | 9/2007 | Khangar et al. |
| 2007/0253788 A1 | 11/2007 | Miebach |
| 2007/0264094 A1 | 11/2007 | Seeley |
| 2007/0277656 A1 | 12/2007 | Zeiler et al. |
| 2008/0008548 A1 | 1/2008 | Corso et al. |
| 2010/0003094 A1 | 1/2010 | Durfee |
| 2010/0054880 A1 | 3/2010 | Ray |
| 2010/0303568 A1 | 12/2010 | York |
| 2011/0138974 A1 | 6/2011 | Arslan |
| 2011/0197389 A1 | 8/2011 | Ota et al. |
| 2012/0090434 A1 | 4/2012 | Chen |
| 2012/0134759 A1 | 5/2012 | Jaeger et al. |
| 2012/0134760 A1 | 5/2012 | Jordan et al. |
| 2012/0207557 A1 | 8/2012 | Durfee |

FOREIGN PATENT DOCUMENTS

| | | |
|---|---|---|
| DE | 282475 | 8/1913 |
| DE | 3719758 | 1/1989 |
| DE | 3738000 | 5/1989 |
| EP | 0118806 | 9/1984 |
| EP | 0870561 | 10/1998 |
| EP | 1358979 | 11/2003 |
| FR | 2271000 | 12/1975 |
| FR | 2457752 | 12/1980 |

(56) References Cited

FOREIGN PATENT DOCUMENTS

| | | | |
|---|---|---|---|
| FR | 2726782 | | 5/1996 |
| GB | 4637 A | * | 0/1910 |
| GB | 674018 | | 6/1952 |
| GB | 791571 | | 3/1958 |
| GB | 1542219 | | 3/1979 |
| GB | 1568013 A | * | 5/1980 |
| GB | 2225262 | | 5/1990 |
| GB | 2431127 | | 4/2007 |
| JP | H08-238617 | | 9/1996 |
| JP | 11-179720 | | 7/1999 |
| JP | 1188519 | | 7/1999 |
| JP | 11188518 | | 7/1999 |
| JP | 2005144655 | | 6/2005 |
| SU | 426826 | | 12/1974 |
| WO | WO 85/02442 | | 6/1985 |
| WO | WO 89/00097 | | 1/1989 |
| WO | WO 2011/028470 | | 3/2011 |

OTHER PUBLICATIONS

Selected Milwaukee Bits, available on http://www.milwaukeetool.com (available at least as early as Aug. 25, 2010).

* cited by examiner

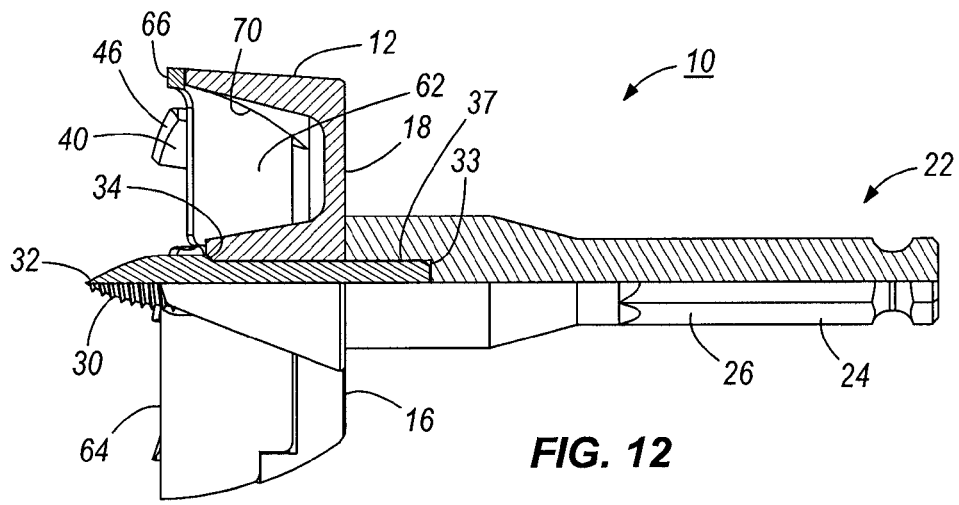
FIG. 12
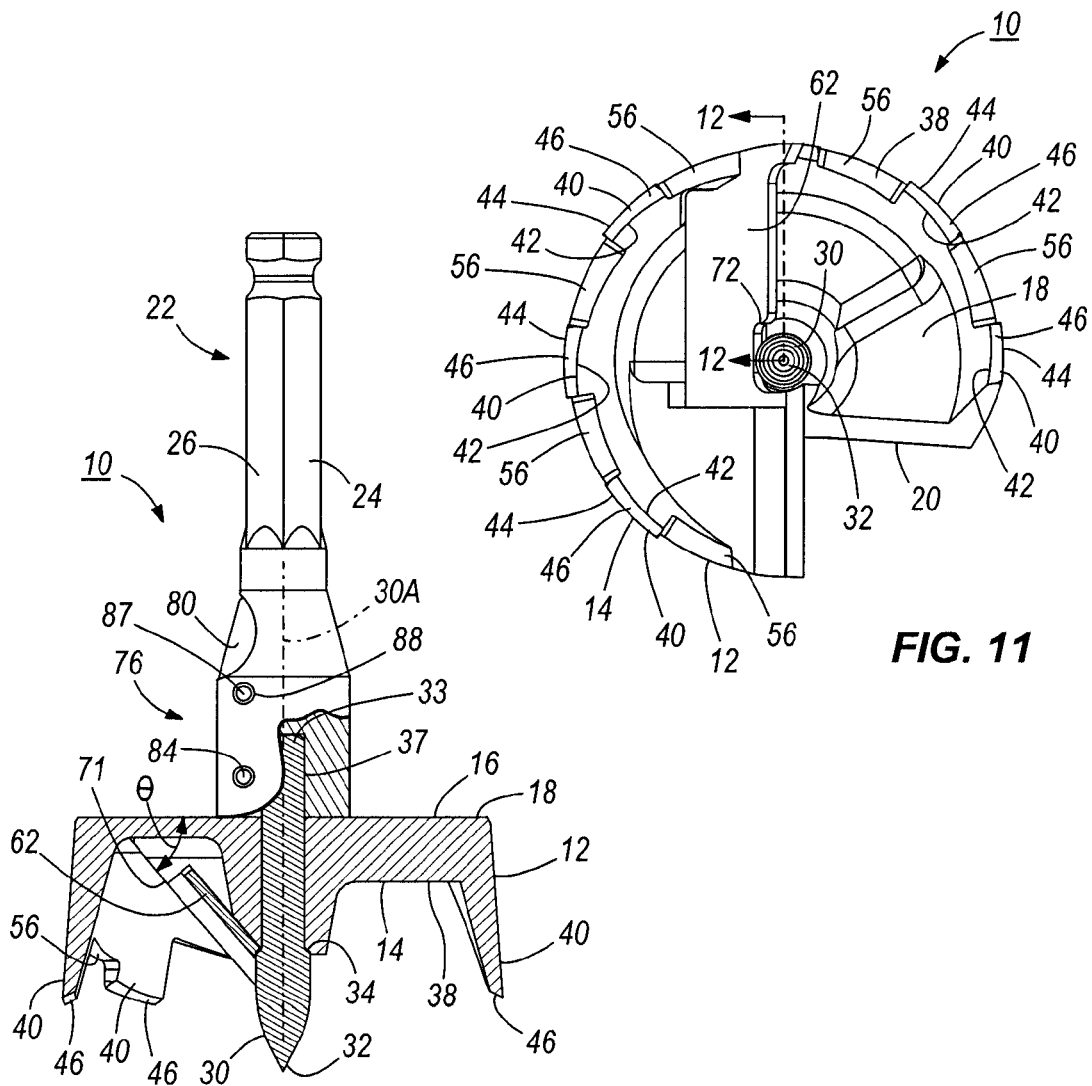
FIG. 11
FIG. 10

CUTTING TOOL

RELATED APPLICATIONS

The present application is a continuation of U.S. patent application Ser. No. 12/869,831, filed Aug. 27, 2010, the entire contents of which are hereby incorporated by reference.

U.S. patent application Ser. No. 12/869,831 is a continuation of U.S. patent application Ser. No. 12/264,960, filed Nov. 5, 2008, now U.S. Pat. No. 8,328,477. U.S. patent application Ser. No. 12/264,960 claims priority to U.S. Provisional Patent Application No. 61/001,837, filed Nov. 5, 2007, and is a continuation-in-part of U.S. patent application Ser. No. 11/681,546, filed Mar. 2, 2007, now U.S. Pat. No. 7,625,160, and U.S. patent application Ser. No. 11/681,553, filed Mar. 2, 2007, now U.S. Pat. No. 7,661,911, both of which claim priority to U.S. Provisional Patent Application No. 60/778,287, filed Mar. 2, 2006, and U.S. Provisional Patent Application No. 60/786,654, filed Mar. 28, 2006. The entire contents of all the above applications are hereby incorporated by reference.

BACKGROUND

The present invention relates to cutting tools and, more particularly, to a rotary cutting tool for a power tool.

SUMMARY

In some embodiments, the invention provides a cutting tool, including a body, a feed screw, and a blade removably supported in the body adjacent to the feed screw. The cutting tool can include teeth positioned circumferentially around and extending outwardly from the body and a locking mechanism for removably securing the blade to the body. In some embodiments, the locking mechanism is movable relative to the body between a locked position, in which the locking mechanism secures the blade to the body, and an unlocked position, in which the blade is removable from the body.

In addition, the present invention provides a cutting tool including a body having a plurality of teeth and a blade removably supported in the body. The cutting tool can also include a locking mechanism, which orients the blade with respect to at least one of the plurality of teeth to maintain a desired spacing between the blade and the at least one of the plurality of teeth.

The present invention also provides a method of operating a cutting tool, including the acts of providing a cutting tool having a tool body and a plurality of teeth positioned along the body, removably securing a blade to the body, and cutting a workpiece with the blade and the teeth. The method can also include the acts of removing the blade from the body and inserting a second blade into the body.

In some embodiments, the invention provides a blade for a cutting tool, the cutting tool being supportable on a spindle of a power tool. The blade can include a blade body removably supportable on the cutting tool and being moveable with the cutting tool relative to the power tool for cutting a workpiece. The blade can further include a first cutting edge extending outwardly from the blade body and a second cutting edge extending outwardly from the blade body. When the blade is supported in the cutting tool, the first cutting edge can extend radially across an end of the cutting tool and the second cutting edge can be positioned adjacent to an outer circumference of the cutting tool.

In some embodiments, the invention provides a blade for a cutting tool, the cutting tool being supportable on a spindle of a power tool. The blade can include a blade body removably supportable in the cutting tool and being moveable with the cutting tool relative to the power tool for cutting a workpiece. The blade can further include a first cutting edge extending outwardly from the blade body and a second cutting edge extending outwardly from the blade body at least about 0.02 inches beyond the first cutting edge.

In some embodiments, the invention provides a blade for a cutting tool, the cutting tool being supportable on a spindle of a power tool. The blade includes a blade body removably supportable in the cutting tool and being moveable with the cutting tool relative to the power tool for cutting a workpiece. The blade can further include a first cutting edge extending outwardly from the blade body, a second cutting edge extending outwardly from the blade body, and a locking surface positioned between the first cutting edge and the second cutting edge and being engageable with a locking arrangement of the cutting tool to secure the blade to the cutting tool.

In some embodiments, the invention provides a method of operating a cutting tool. The method can include the acts of securing the cutting tool to a spindle of a power tool, securing a blade to the cutting tool such that a first cutting edge and a second cutting edge of the blade extend outwardly from an end of the cutting tool, cutting a workpiece with the cutting tool, and removing the blade from the cutting tool.

The present invention also provides a cutting tool comprising a body defining an axis and being adapted to be supported by a spindle of a power tool, and a blade removably supportable on the body and being rotatable about the axis for cutting a workpiece. The cutting tool can also include a feed shaft removably supportable in the body, engageable with the blade to at least partially restrain the blade from movement relative to the body, and rotatable about the axis for engaging the workpiece. The feed shaft can include an opening extending transverse to the axis. The cutting tool can further include a locking member moveable through the opening for engagement with the body and the feed shaft to tighten both the blade and the feed shaft to the body.

In other embodiments, the cutting tool can include a body defining an axis and being adapted to be supported by a spindle of a power tool, a blade removably supportable on the body and being rotatable about the axis for cutting a workpiece, and a feed shaft removably supportable in the body, engageable with the blade to at least partially restrain the blade from movement relative to the body, and rotatable about the axis for engaging the workpiece. The cutting tool can also include a locking member engageable with both the body and the feed shaft. Incremental movement of the feed shaft relative to the body can incrementally tighten the blade to the body.

In some embodiments, the cutting tool can also include a body defining an axis and a support surface and being adapted to be supported by a spindle of a power tool, a blade removably supportable on the support surface of the body and being rotatable about the axis for cutting a workpiece, and a feed shaft removably supportable in the body, engageable with the blade to at least partially restrain the blade from movement relative to the body, and rotatable about the axis for engaging the workpiece. The cutting tool can also include a locking mechanism engageable with the feed shaft and configured to fix the position of the feed shaft relative to the body, and a protrusion extending outwardly from one of the support surface of the body and the blade and being engageable in a recess formed in the other of the support surface of the body and the blade to further restrain movement of the blade relative to the body.

Other aspects of the invention will become apparent by consideration of the detailed description and accompanying drawings.

BRIEF DESCRIPTION OF THE DRAWINGS

FIG. 10 is a partial section view of the cutting tool shown in FIG. 1.

FIG. 11 is front view of the cutting tool shown in FIG. 1.

FIG. 12 is a partial section view taken along line 12-12 of FIG. 11.

DETAILED DESCRIPTION

Figure 1:
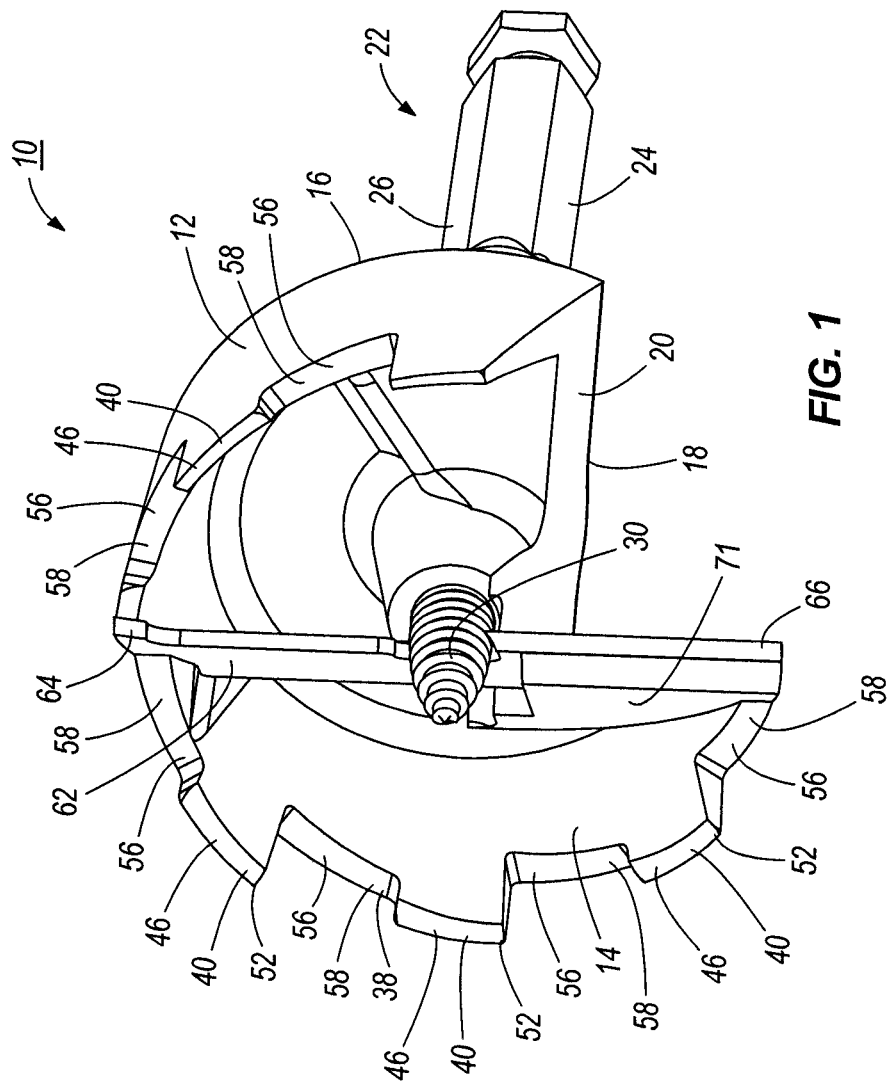
FIG. 1 is a front perspective view of a cutting tool according to some embodiments of the present invention.
Figure 2:
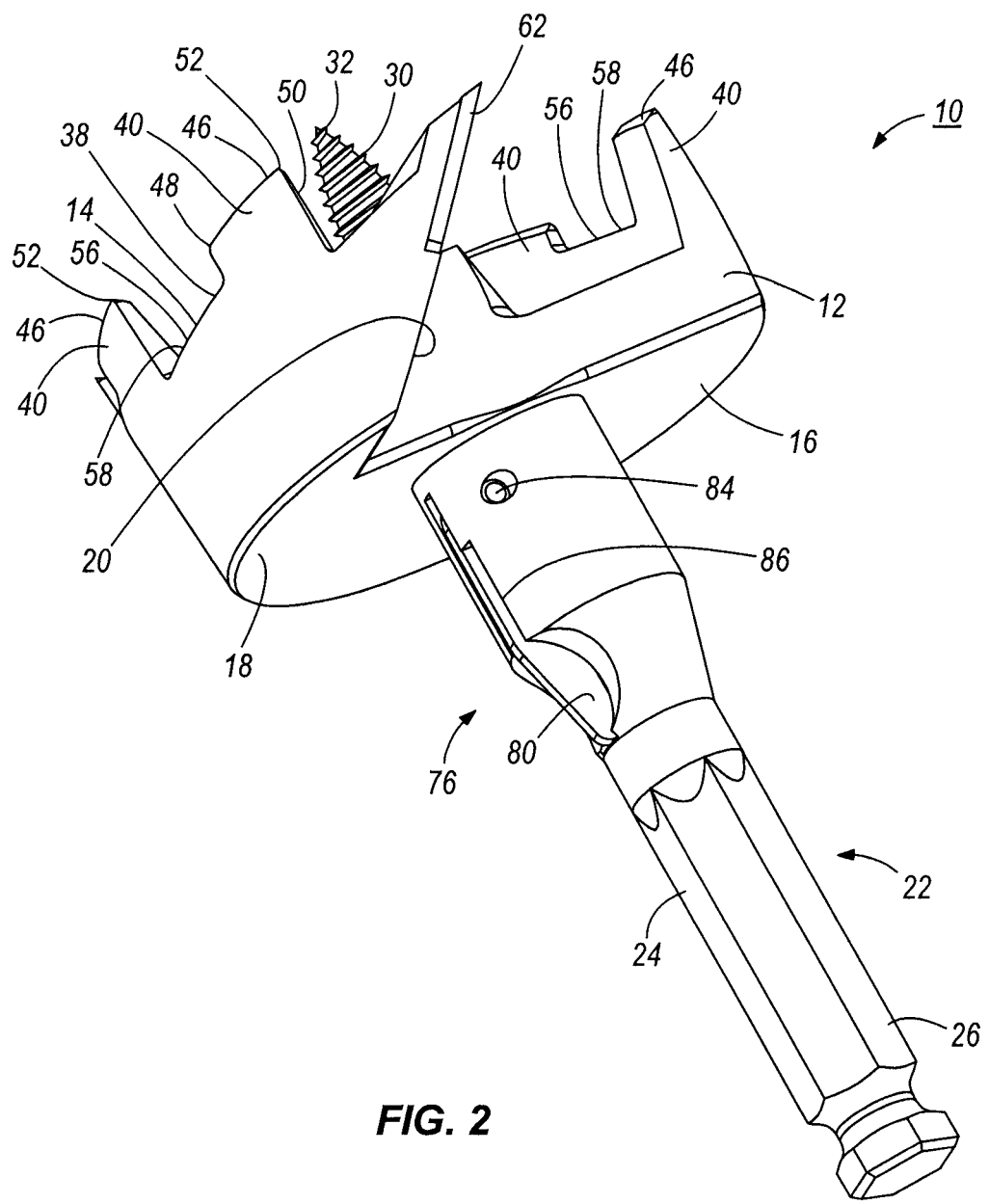
FIG. 2 is a side perspective view of the cutting tool shown in FIG. 1 with a locking arrangement in a locked position.
Figure 3:
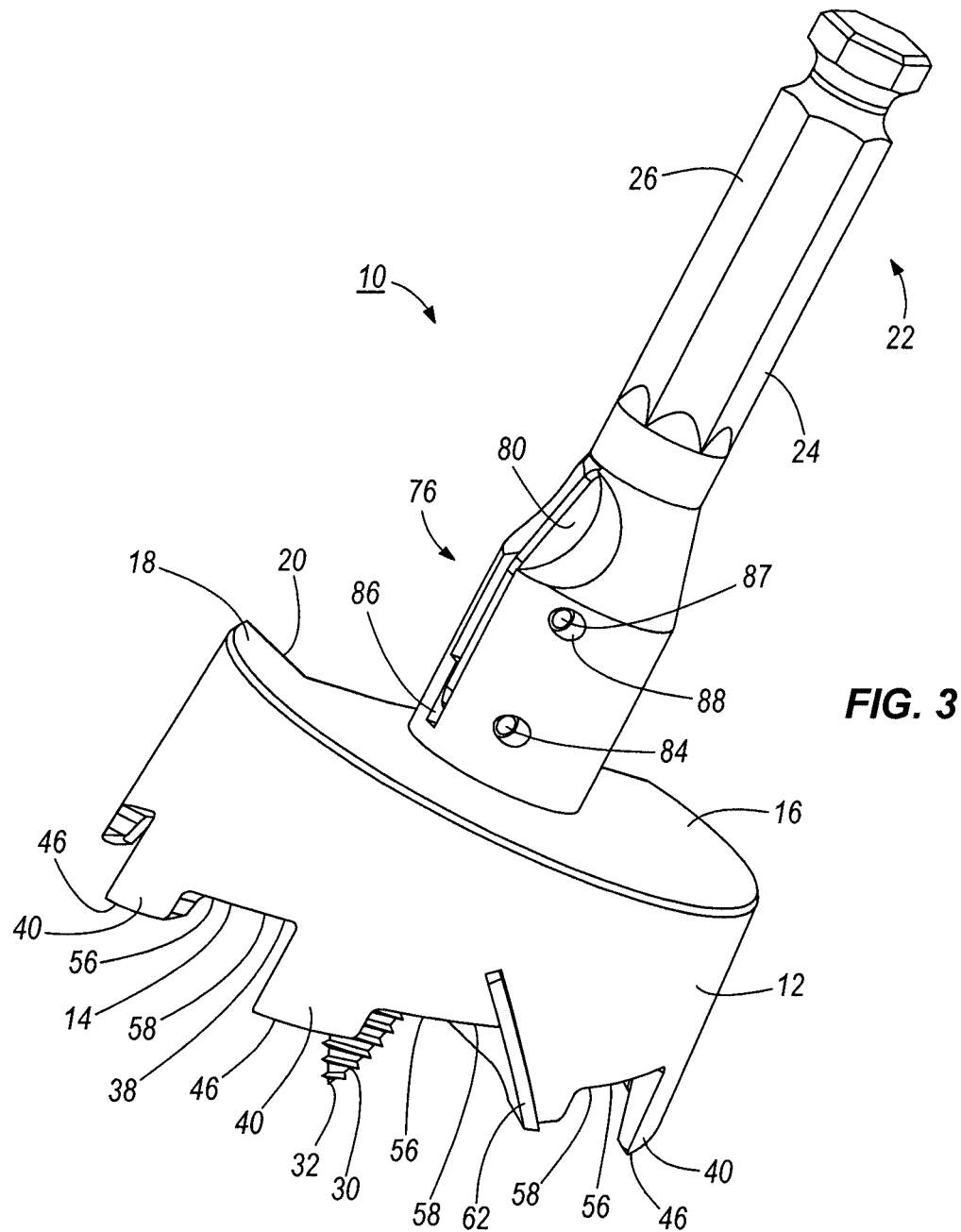
FIG. 3 is a rear perspective view of the cutting tool shown in FIG. 1 with the locking mechanism in the locked position.
Figure 4:
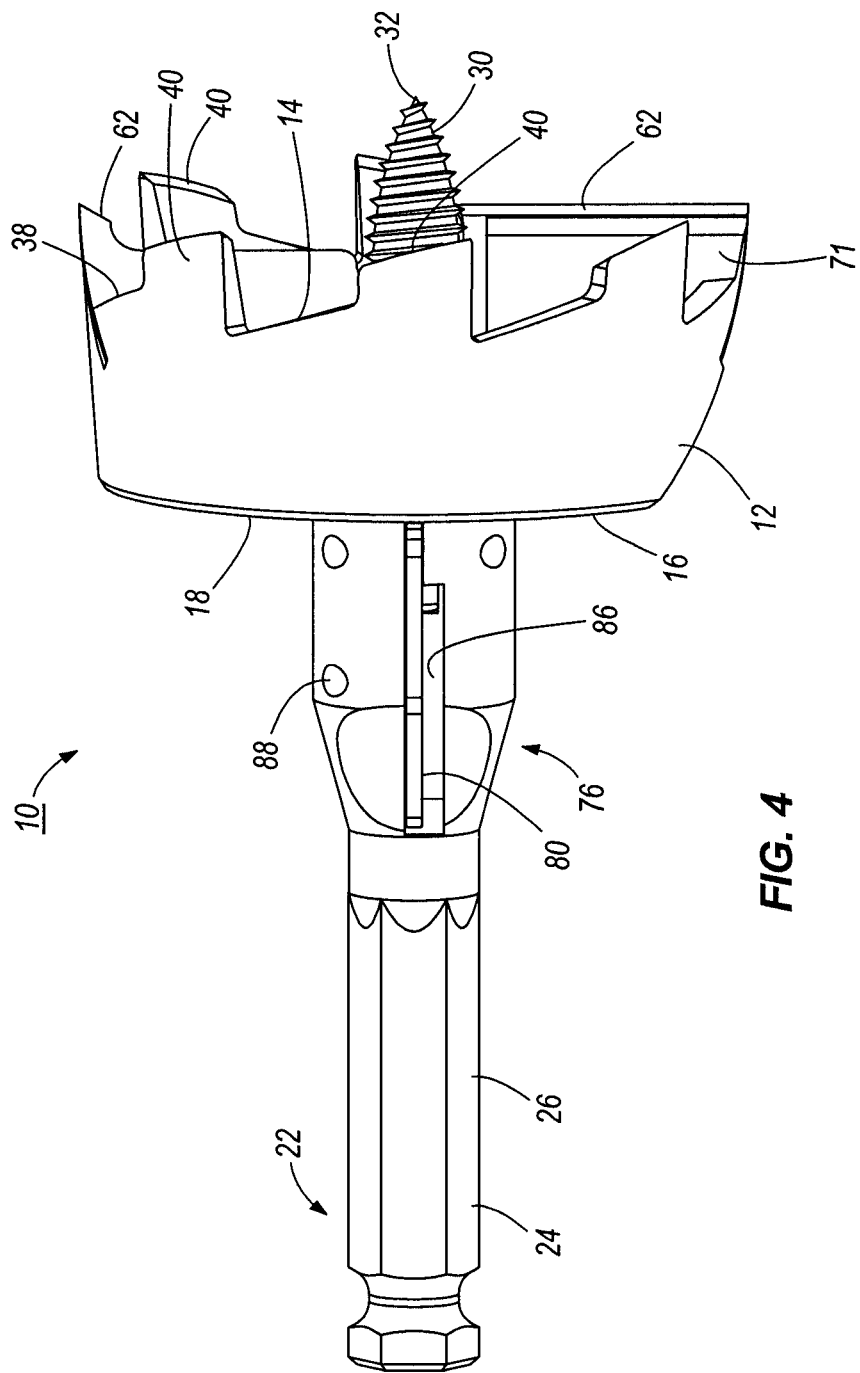
FIG. 4 is a top view of the cutting tool shown in FIG. 1 with the locking mechanism in the locked position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," and "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In addition, it is to be understood that phraseology and terminology used herein with reference to device or element orientation (such as, for example, terms like "front," "rear," "top," "bottom," "lower", "up," "down," etc.) are only used to simplify description of the present invention, and do not alone indicate or imply that the device or element referred to must have a particular orientation. The elements of the present invention can be installed and operated in any orientation desired. In addition, terms such as "first", "second," and "third" are used herein for purposes of description and are not intended to indicate or imply relative importance or significance.

FIGS. 1-17 illustrate a cutting tool or bit 10 for use with a power tool, such as, for example, a drill, a driver drill, a screwdriver, and the like. As shown in FIGS. 1-17, the cutting tool 10 includes a generally cylindrically-shaped body 12 having a first or workpiece-engaging end 14 and a second or rearward end 16. The second end 16 includes a base 18 having an opening 20 to at least partially facilitate chip removal from the body 12 of the cutting tool 10.

A connecting structure 22 is supported on the second end 16 of the body 12 and includes an elongated rearwardly-extending drive shaft 24 configured to be received in a tool holder or chuck of a power tool. In the illustrated embodiment of FIGS. 1-17, the drive shaft 24 has a substantially hexagonal cross-sectional shape and includes six flat sides 26. In other embodiments, the drive shaft 24 can have other cross-sectional shapes, such as, for example, round, triangular, rectangular, trapezoidal, or any other polygonal shape, oval, irregular, and the like and can include one or more flat sides 26.

A feed shaft 30 extends forwardly from the first end 14 of the body 12. In the illustrated embodiment of FIGS. 1-17, the feed shaft 30 is generally aligned with the drive shaft 24 along a longitudinal axis 30A (shown in FIG. 10). In other embodiments, the feed shaft 30 and the drive shaft 24 can have other relative orientations.

As shown in FIGS. 1-17, the feed shaft 30 includes a tapered first end 32 and a second end 33. In some embodiments, threads extend radially outwardly from the first end 32 of the feed shaft 30 and extend helically around the first end 32 for threadably engaging a workpiece. The configuration (size, shape, pitch, number, etc.) of the threads on the first end 32 and the shape or profile of the first end itself may vary and may be particularly suited for particular applications (e.g., material to be cut). In the illustrated embodiment, a ridge 34 extends circumferentially around the feed shaft 30 adjacent to the first end 32 and a recess 36 (shown in FIG. 9) extends around at least a portion of circumference of the second end 33 of the feed shaft 30. The second end 33 of the feed shaft 30 is received in a cavity, or recess 37 in the drive shaft 24.

A rim 38 extends circumferentially around the first end 14 of the body 12. As shown in FIGS. 1-17, teeth 40 extend axially outwardly from the rim 38 and are spaced circumferentially around the rim 38. In the illustrated embodiment of FIGS. 1-17, five teeth 40 are spaced circumferentially around the rim 38 at regular intervals. In other embodiments, one, two, three, four, six, or more teeth 40 can be spaced circumferentially around the rim 38 at regular or irregular intervals.

In some embodiments, outer ends of the teeth 40 are tapered or sloped to provide sharpened cutting edges. In the illustrated embodiment of FIGS. 1-17, outer surfaces of the teeth 40 are tapered or sloped from a radial inner side 42 toward a radial outer side 44 such that a raised cutting edge 46 is formed around the outer circumference of each cutting tooth 40. Alternatively or in addition, the teeth 40 can be sloped or tapered in a circumferential direction. As shown in FIGS. 1-17, the teeth 40 can slope upwardly from a trailing edge 48, which extends outwardly away from the base 18 a first distance, toward a leading edge 50, which extends outwardly away from the base 18 a second larger distance, to provide a sharpened cutting tip 52 adjacent to the leading edge 50 of each tooth 40. In these embodiments, the cutting edge 46 can be oriented at an angle α with respect to the base 18 of the body 12.

As shown in FIGS. 1-17, gullets 56 extend axially through the body 12 between adjacent cutting teeth 40. In some embodiments, such as the illustrated embodiment of FIGS. 1-17, the base 58 of each gullet 56 is oriented at an angle β with respect to the base 18 of the body 12 such that a trailing or downstream end of each gullet 56 is spaced a first distance from the base 18 of the body 12 and a leading end or upstream end of each gullet 56 is spaced a second larger distance from the base 18 of the body 12. In some such embodiments, the angle α of cutting edge 46 of at least one of the teeth 40 is substantially equal to the angle β of the base 58 of at least one of the gullets 56.

The cutting tool 10 also includes a blade 62 supported in the body 12 and having a first cutting or lifting edge 64 and a second cutting or lifting edge 66. In the illustrated embodiment of FIGS. 1-17, the blade 62 includes a blade body 68 supported in a slot 70 formed in the body 12. The blade 62 is oriented at an angle θ (shown in FIG. 10) with respect to the base 18 of the body 12. The body 12 of the cutting tool 10 can also include a ramp 71 for supporting the blade 62 in a desired orientation in the body 12. As shown in FIGS. 6, 7, and 9-13, the blade body 68 defines an opening 72 extending between the first and second edges 64, 66. In some embodiments, such as the illustrated embodiment of FIGS. 1-17, and as explained in greater detail below, the feed shaft 30 is engageable with the blade body 68 to secure the blade 62 in the body 12 of the cutting tool 10.

The blade 62 may be constructed of one or more materials suitable for a cutting operation including, but not limited to, low alloy and alloyed steel and non-ferrous materials and various heat-treated metals, ceramic, composite materials (including some plastics). The first and second edges 64 and 66 and/or the blade body 68 may be coated using various coating technologies, such as, for example chemical vapor deposition (CVD), physical vapor deposition (PVD), etc.

Figure 14:
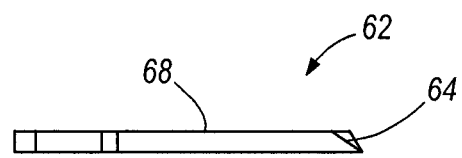
FIG. 14 is a side view of the blade shown in FIG. 13.
Figure 14A:
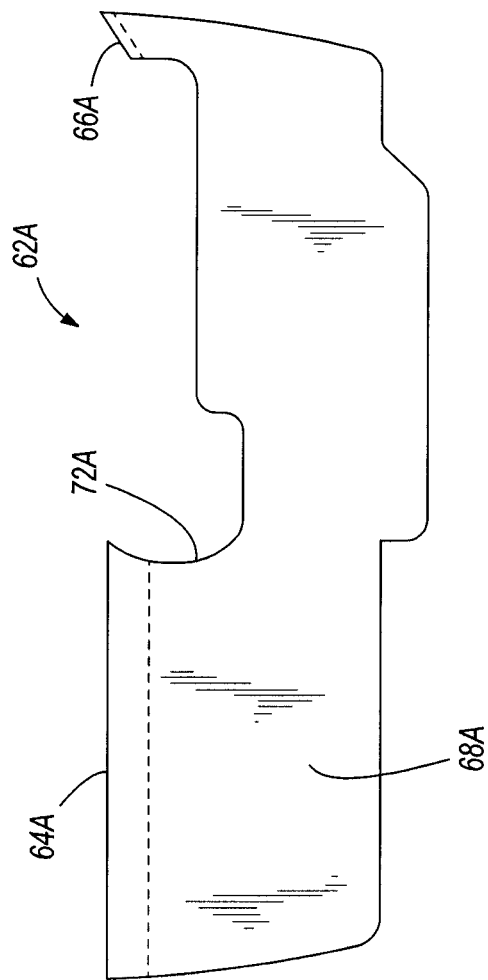
FIG. 14A is a front view of an alternate blade of the cutting tool shown in FIG. 1.
Figure 14B:
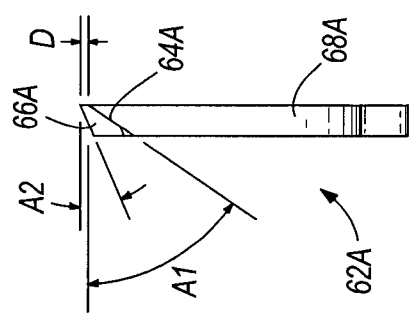
FIG. 14B is a side view of the blade shown in FIG. 14A.

FIGS. 14A and 14B illustrate an alternate blade 62A, which includes some generally similar features as the blade 62, which are given similar reference numerals, appended by the letter "A". In some embodiments, such as the illustrated embodiment of FIG. 14B, the first edge 64A of the blade 62A extends outwardly from the blade body 68A a first distance, and the second edge 66A of the blade 62A extends outwardly from the blade body 68A a second distance greater than the first distance. In some such embodiments, the second edge 66A extends about 0.02 inches further than the first edge 64A. The difference in the extended lengths of the first edge 64A and the second edge 66A is labeled D.

Returning now to FIGS. 13 and 14, the thickness of the blade 62 as illustrated is only exemplary, and in some embodiments, the blade 62 is provided with a relative thickness that is less than or greater than that shown in the figures. For example, the blade 62A of the illustrated embodiment of FIGS. 14A and 14B has a relative thickness that is greater than that of the blade 62 of the illustrated embodiment of FIGS. 13 and 14. The slot 70 in the body 12 can be sized to receive the blade 62 or 62A with a small clearance therebetween. In some embodiments, the blade 62 has a thickness of about 0.080 inches. In other embodiments, the blade 62 or 62A and the slot 70 can have other sizes and dimensions.

As best illustrated in FIG. 14B, the first edge 64A and the second edge 66A are oriented at different angles with respect to the cutting end of the blade 62A. In some embodiments, the first edge 64A is oriented at a first angle A1 and the second edge 66A is oriented at a second angle A2 with respect to the cutting end of the blade 62A. The first angle A1 can be greater than the second angle A2. In some embodiments, the first angle A1 is about 55 degrees and the second angle A2 is about 20 degrees.

In some embodiments, the blade body 68 is formed from two materials. In these embodiments, one or both of the first and second edges 64, 66 can be formed from a first material, such as, for example, high-speed steel, machine steel, or the like, and the blade body 68 can be formed from a second material, such as, for example, spring-steel or another relatively flexible material, which allows for slight elastic deformation during operation of the cutting tool 10. In these embodiments, the two materials can be bonded together. For example, in some embodiments, one or both of the first and second edges 64, 66 can be laser welded to the blade body 68. In other embodiments, the first and second edges 64, 66 can be coated, hardened, and/or tempered.

Figure 14C:
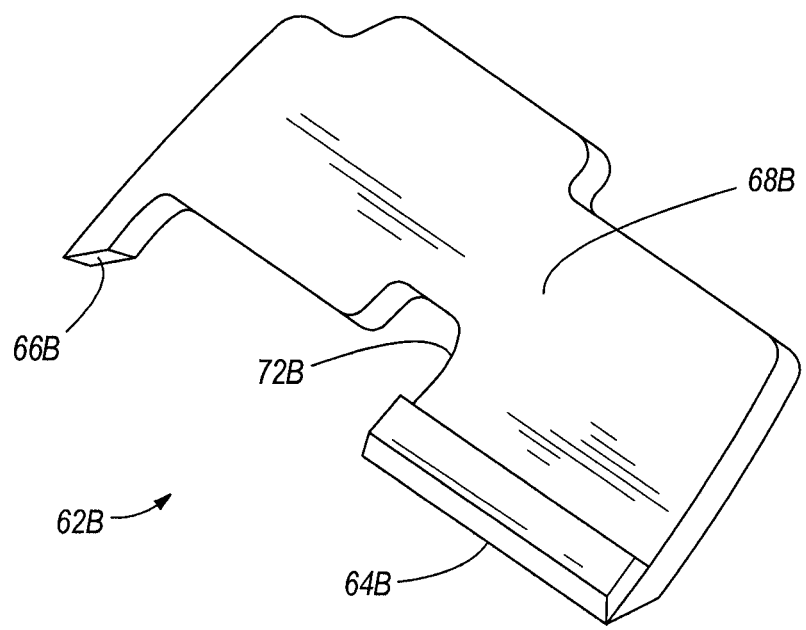
FIG. 14C is a perspective view of another alternate blade of the cutting tool shown in FIG. 1.
Figure 15:
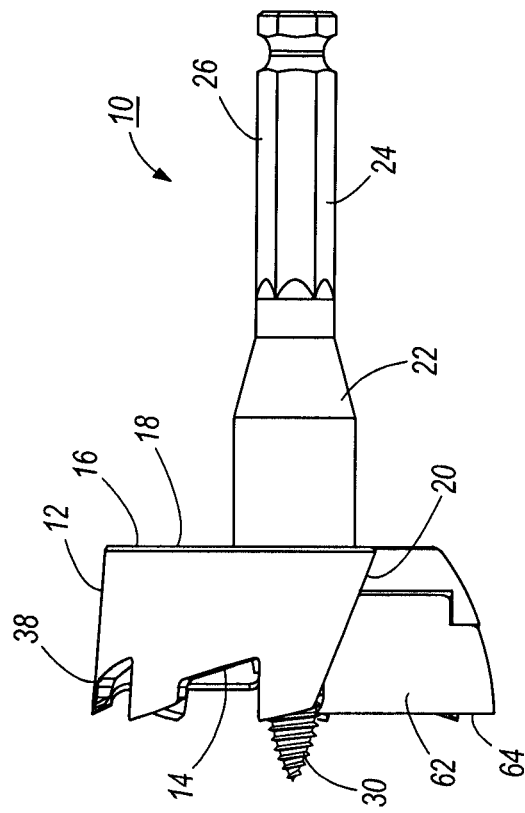
FIG. 15 is a side view of the cutting tool shown in FIG. 1.
Figure 16:
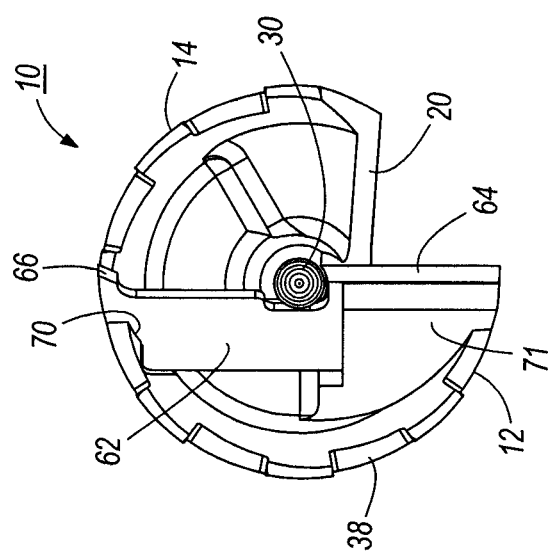
FIG. 16 is a front view of the cutting tool shown in FIG. 1.
Figure 17:
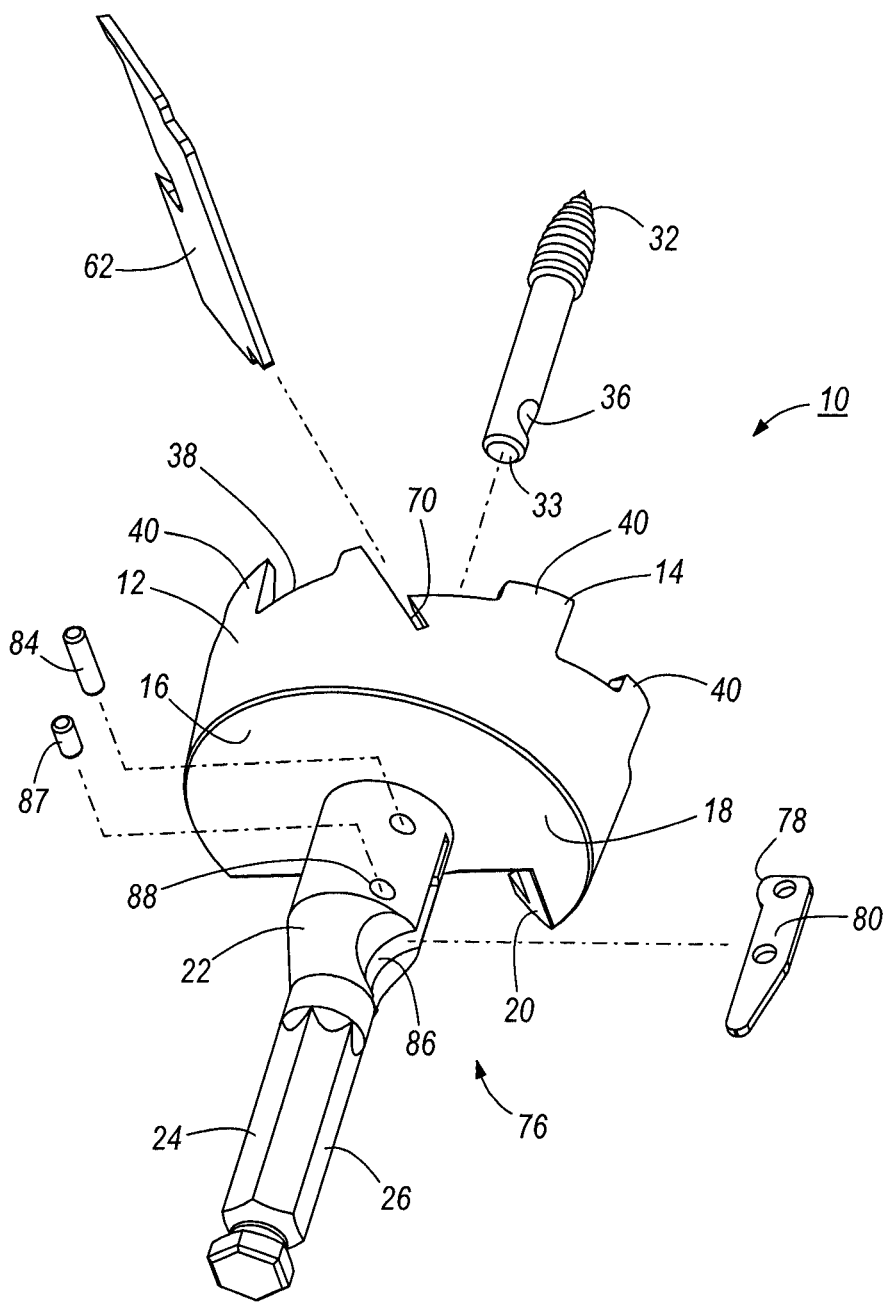
FIG. 17 is an exploded view of the cutting tool shown in FIG. 1.

FIG. 14C illustrates a blade 62B having a separately-formed first cutting edge 64B that is connected to the blade body 68B. The blade 62B is otherwise generally similar to the blades 62 and 62A described above. Similar reference numerals are used for similar features, those in FIG. 14C being appended with the letter "B". The first cutting edge 64B may be constructed of a first material (e.g., carbide, ceramic, etc.), and the blade body 68B may be constructed of a second material different than the first material. The first material may be particularly suited for a cutting operation and may be harder and more rigid than the second material. Additionally, although not illustrated, any of the blades 62, 62A, and 62B shown and described herein may include one or more serrated and/or discontinuous cutting edges and/or tip and edge profiles other than those shown and described herein.

In some embodiments, as shown in FIGS. 6, 7, 11-13, 15, and 16, the blade body 68 includes first and second shoulders on the end opposite the first and second edges 64, 66. In some such embodiments, the shoulders are formed by notches extending through the blade body 68. The shoulders engage corresponding structure on the cutting tool body 12 to maintain the position of the blade 62 with respect to the cutting tool body 12. Particularly, the shoulders prevent and/or reduce movement of the blade body 68 relative to the cutting tool body 12 in a direction substantially perpendicular to the axis of the cutting tool body 12.

In the illustrated embodiment, the shoulders are formed by substantially square notches. However, in some embodiments, the shoulders may be formed by notches of a different size, shape, and/or orientation. Furthermore, in some embodiments (such as the blade 62A illustrated in FIGS. 14A and 14B and the blade 62B illustrated in FIG. 14C), the two shoulders are of dissimilar size, shape, and/or orientation such that the blades 62A and 62B are insertable into the cutting tool body 12 in only a single predetermined orientation.

As shown in FIGS. 1-17, the cutting tool 10 can include a locking mechanism 76 for securing the blade 62 in the body 12 of the cutting tool 10. In some embodiments, such as the illustrated embodiment of FIGS. 1-17, the locking mechanism 76 can include a locking member 78 which is supported in the connecting structure 22 of the cutting tool 10 and is movable relative to the connecting structure 22 between a locked position (shown in FIGS. 2-4 and 8-10) and an unlocked position (shown in FIGS. 5-7). The locking mechanism 76 can also include an actuator 80 for moving the locking member 78 between the locked position and the unlocked position.

In the unlocked position, the locking member 78 is moved away from and out of engagement with the feed shaft 30 so that the feed shaft 30 and/or the blade 62 can be removed from the body 12 of the cutting tool 10 so that the feed shaft 30 and/or the blade 62 can be replaced or repaired.

As the locking member 78 is moved toward the locked position, the locking member 78 cammingly engages the recess 36 formed on the second end 33 of the feed shaft 30 to seat the blade 62 in the slot 70 in the body 12 of the cutting tool 10. This camming action can also orient the first edge 64 of the blade 62 and/or the second edge 66 of the blade 62 in a desired orientation with respect to the cutting edge 46 of one or more of the teeth 40. In the illustrated embodiment of FIGS. 1-17, this camming action of the locking member 78 moves the blade body 68 downwardly along the ramp 71 into the slot 70 and toward the base 18 of the body 12 so that the first edge 64 of the blade 62 extends outwardly from the base 18 a first distance and the second edge 66 of the blade along with the cutting edges 46 of the teeth 40 extends outwardly from the base 18 a second greater distance. In some such embodiments, when the locking member 78 is moved toward the locked position, the second edge 66 of the blade 62 and the cutting edges 46 of the teeth 40 extend outwardly from the base 18 of the body 12 in an axial direction about 0.02 inches beyond the first edge 64 of the blade 62. In these embodiments, the blade 62 can be replaced and be reset in the body 12 of the cutting tool 10 in a desired orientation without requiring the operator to perform any complicated setup or measuring operations.

Figure 5:
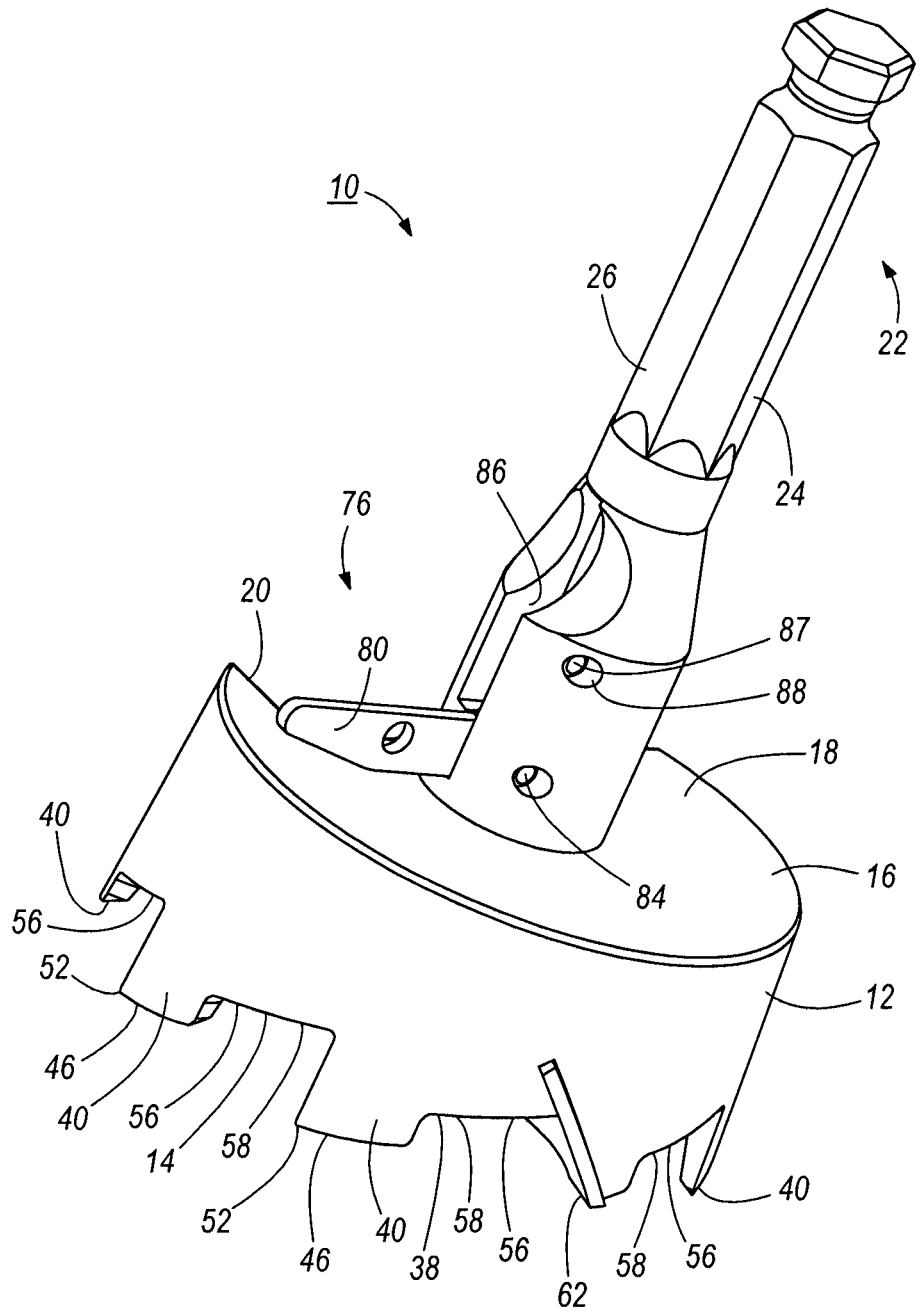
FIG. 5 is a rear perspective view of the cutting tool shown in FIG. 1 with the locking mechanism in an unlocked position.
Figure 6:
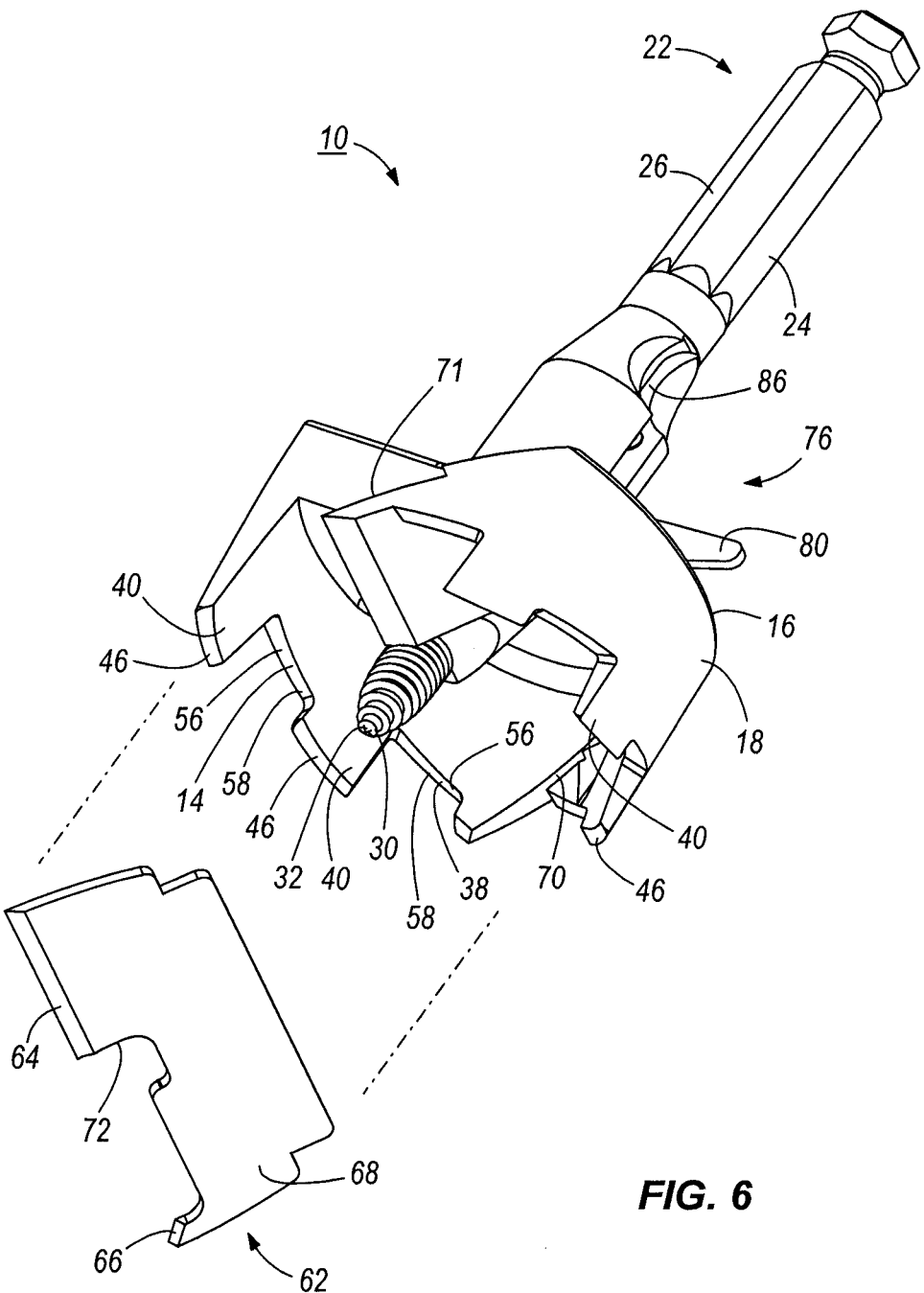
FIG. 6 is a front exploded perspective view of the cutting tool shown in FIG. 1.
Figure 7:
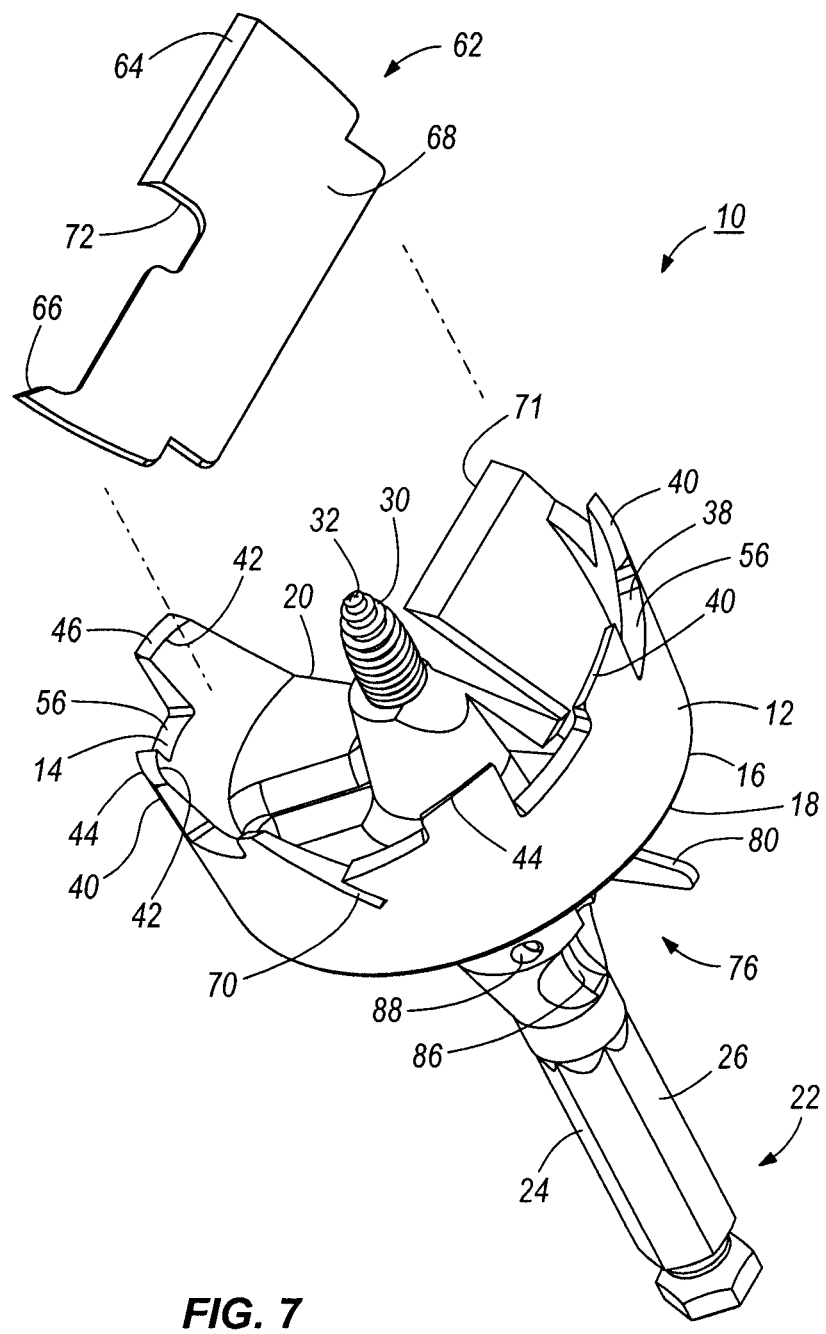
FIG. 7 is another front exploded perspective view of the cutting tool shown in FIG. 1.
Figure 9:
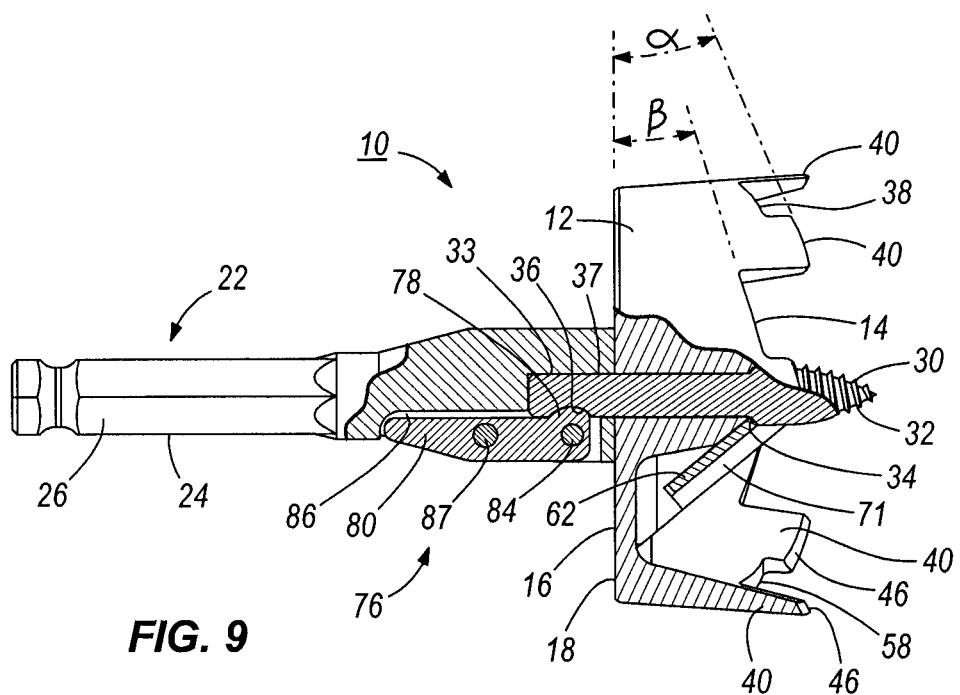
FIG. 9 is a partial section view of the cutting tool shown in FIG. 1.
Figure 8:
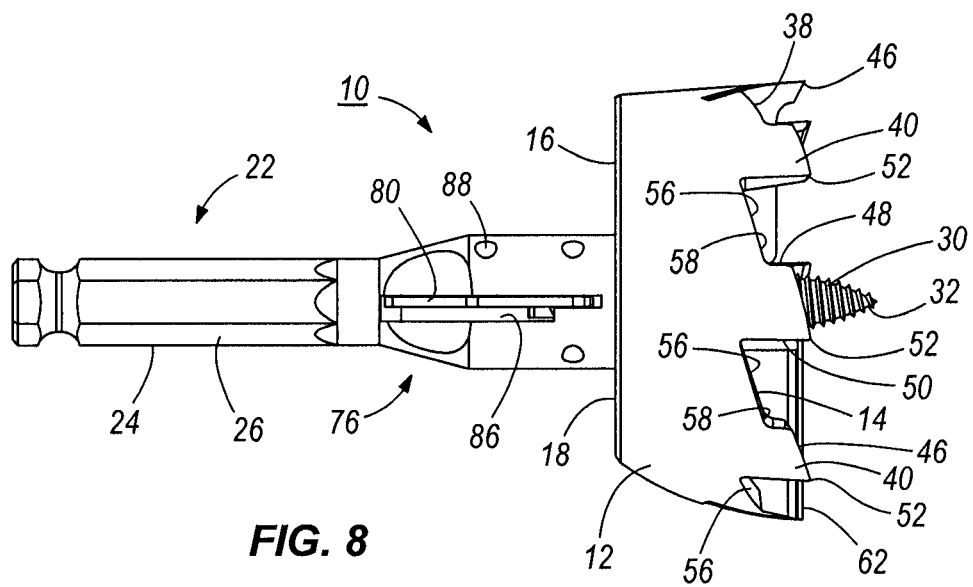
FIG. 8 is a side view of the cutting tool shown in FIG. 1.
Figure 13:
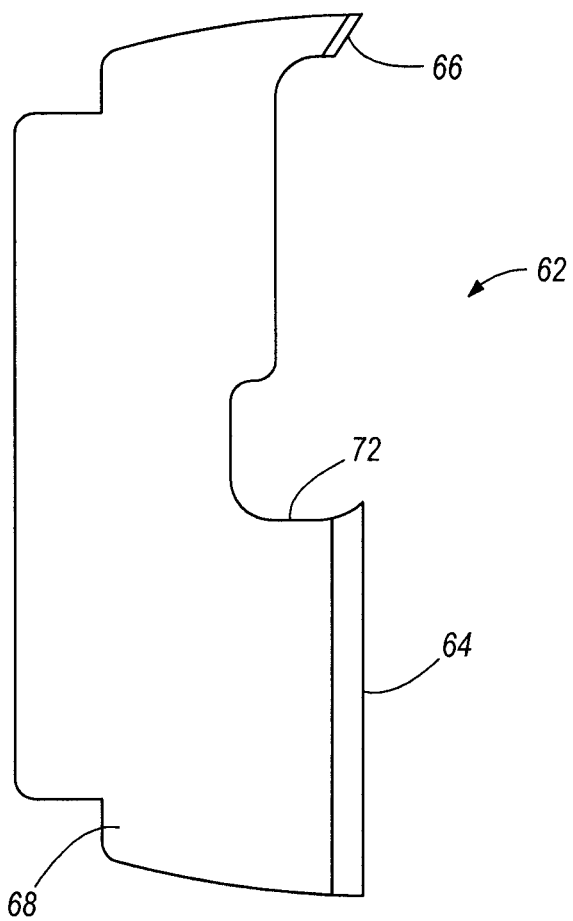
FIG. 13 is an enlarged front view of a blade of the cutting tool shown in FIG. 1.

In the illustrated embodiment of FIGS. 1-17, an operator can pivot the actuator 80 about a pivot member or pin 84 defining a pivot axis, which extends radially through the connecting structure 22, to move the locking member 78 between the locked position and the unlocked position. As shown in FIGS. 2-4 and 8-10, an operator moves the actuator 80 toward a first position, in which the actuator 80 is supported in a recess 86 formed in the connecting structure 22 and in which the actuator 80 is generally axially aligned with the drive shaft 24 of the cutting tool 10, to move the locking member 78 toward the locked position. As shown in FIGS. 5-7, an operator can move the actuator 80 toward a second position, in which the actuator 80 is moved out of the recess 86 and in which at least a portion of the actuator 80 extends radially outwardly from the connecting structure 22 of the cutting tool 10, to move the locking member 78 toward the unlocked position.

In some embodiments, a securing member, such as a pin 87, is engageable with a corresponding recess 88 in the connecting structure 22 and a corresponding recess in the actuator 80 to maintain the actuator 80 in the locked position. In other embodiments, the actuator 80 can include an outwardly extending projection, which is engageable in the recess 88 to maintain the actuator 80 in the locked position in the recess 86 in the connecting structure 22. In still other embodiments, the locking mechanism 76 can include one or more magnets for maintaining the actuator 80 in the locked position.

In the illustrated embodiment, the engagement between the recess 36 of the feed shaft 30 and the locking member 78 not only fixes the feed shaft 30 axially, but also prevents relative rotation between the feed shaft 30 and the cutting tool body 12. The feed shaft 30 and the recess 37 may additionally be provided with corresponding hexagonal or otherwise inter-engaging cross-sections to prevent relative rotation therebetween. In other embodiments, some of which are described further below, the feed shaft 30 is fixed axially and rotationally by separate mechanisms.

During operation, an operator secures the connecting structure 22 of the cutting tool 10 to a power tool and positions the cutting tool 10 above or in front of a work piece. The operator then centers the feed shaft 30 above the intended cutting location and activates the power tool to rotate the cutting tool 10 about the axis of the feed shaft 30. As the cutting tool 10 rotates, the threads of the feed shaft 30 are driven into the workpiece. The engagement between the threads and the workpiece draws the cutting tool 10 into the workpiece.

Continued rotation of the cutting tool 10 moves the cutting edges 46 of the teeth 40 into engagement with the workpiece. As the teeth 40 rotate, the teeth 40 cut a circular path in the workpiece. As the power tool and the threads on the feed shaft 30 continue to move the cutting tool 10 into the workpiece, the first cutting edge 64 and/or the second cutting edge 66 are moved into engagement with the workpiece and begin to remove chips from the workpiece. In general these chips are formed when the teeth 40 score the workpiece. The first cutting edge 64 then lifts the chips from the workpiece and directs the chips upwardly toward the opening 20 in the base 18 and away from the cutting tool 10 and the workpiece.

After performing a number of cutting operations, the first and second edges 64, 66 may become damaged or worn. It has been found that the first and second edges 64, 66 generally wear down and/or are damaged much faster than the cutting edges 46 of the teeth 40. However, to maintain the effectiveness and operational efficiency of the cutting tool 10, the cutting edges 46 of the teeth 40 and the first and second edges 64, 66 must be sharpened at the same time and must be filed an equal amount. If this is not done, the relative orientation between the cutting edges 46 of the teeth 40 and the first and second edges 64, 66 is not maintained and the cutting tool 10 does not operate efficiently or correctly.

Rather than sharpening the first and second edges 64, 66, the operator can pivot the actuator 80 about the pivot axis, moving the locking member 78 from the locked position toward the unlocked position. The operator can then remove the blade 62 and replace the blade 62 with a new blade 62.

Once the new blade 62 is inserted into the slot 70, the operator can replace the feed shaft 30 into the body 12 of the cutting tool 10 and move the actuator 80 and the locking member 78 toward the locking position. As explained above, as the locking member 78 moves toward the locked position, the locking member 78 cammingly engages the feed shaft 30 and moves the feed shaft 30 and the blade 62 toward a desired orientation with respect to the body 12 of the cutting tool 10. The operator can then resume operation of the cutting tool 10 without having to perform complicated measurements and without adversely affecting the performance of the cutting tool 10.

In some embodiments, a cutting tool body 12 and a number of differently-configured blades 62 having, for example, differently-oriented or differently-shaped cutting edges 64, 66, different material properties, etc., can be packaged together and/or offered for sale as a kit. Alternatively, or in addition, a number of differently-sized and/or differently-configured cutting tool bodies 12 (e.g., having different cutting diameters, material properties, numbers of teeth 40, tip profiles, shaft sizes and configurations, etc.) can be packaged together and sold as a kit with two or more blades 62 of different size and or configuration (e.g., having differently-oriented or differently-shaped cutting edges 64, 66, different material properties, etc.).

Alternatively, or in addition, a number of differently-sized and/or differently-configured feed shafts 30 (e.g., having different material, shaft size, thread size, thread orientation, thread pitch, etc.) can be packaged together and sold as a kit with two or more different cutting tool bodies 12 (e.g., having different cutting diameters, material properties, numbers of teeth 40, tip profiles, shaft sizes and configurations, etc.) and/or two or more different blades 62 (e.g., having different cutting diameters, material properties, number of teeth, tip profiles, etc.).

Many additional combinations of cutting tool components may be packaged together and/or offered for sale as a kit to enable a user to assemble and configure one or more cutting tools 10 to particularly suit different applications. The uses or applications may be defined by the materials to be cut (e.g., wood, mica on particle board, laminates, fiberglass over particle board, fiberglass over plywood, drywall, etc.). Alternatively, a kit may include components (such as matched feed shafts 30 and blades 62, for example) that are particularly suited for one specific use or application (e.g., material).

Figure 18:
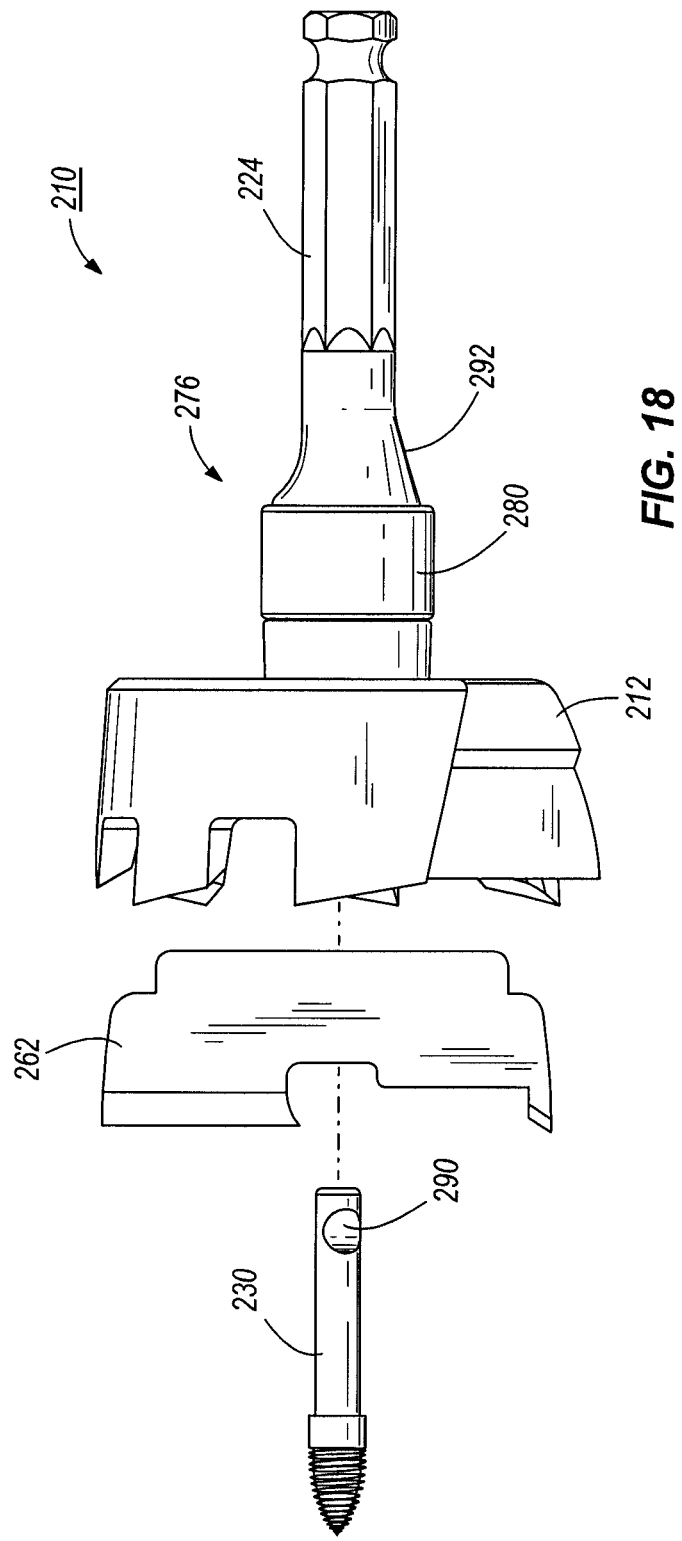
FIG. 18 is an exploded perspective view of an alternate embodiment of the cutting tool of the present invention.

FIG. 18 illustrates an alternate embodiment of a cutting tool 210 according to the present invention. The cutting tool 210 shown in FIG. 18 is similar in many ways to the illustrated embodiments of FIGS. 1-17 described above. Accordingly, with the exception of mutually inconsistent features and elements between the embodiment of FIG. 18 and the embodiments of FIGS. 1-17, reference is hereby made to the description above accompanying the embodiments of FIGS. 1-17 for a more complete description of the features and elements (and the alternatives to the features and elements) of the embodiment of FIG. 18. Features and elements in the embodiment of FIG. 18 corresponding to features and elements in the embodiments of FIGS. 1-17 are numbered in the 200 series.

In the illustrated embodiment of FIG. 18, the cutting tool 210 includes a locking mechanism 276 supported on the drive shaft 224 for securing the feed shaft 230 and/or a blade 262 in a recess in the body 212 of the cutting tool 210. In other embodiments, the locking mechanism 276 can be positioned on other portions of the cutting tool 210. In some embodiments, the locking mechanism 276 can be substantially similar to the quick-change chuck assembly described in U.S. Pat. No. 6,457,916 and/or the tool bit holder described in U.S. Pat. No. 6,561,523, the entire contents of each of which is hereby incorporated by reference.

In some embodiments, a channel extends radially through the drive shaft 224 and opens into the recess in the feed shaft 230. A locking member, such as, for example, a ball, a roller, and the like, is supported in the channel for movement between a locked position, in which the locking member extends outwardly from the channel and into the recess to secure the feed shaft 230 to the cutting tool body 212, and an unlocked position, in which the locking member is movable along the channel and out of the recess.

Figure 31:
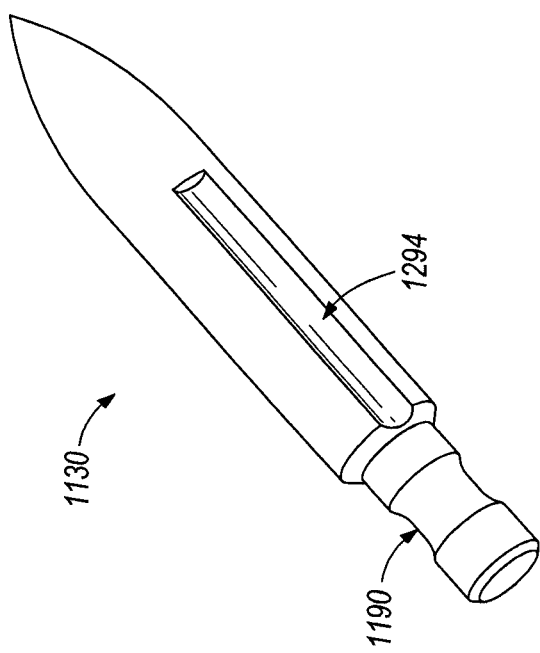
FIG. 31 is a first perspective view of a feed shaft of the cutting tool of FIG. 29.
Figure 32:
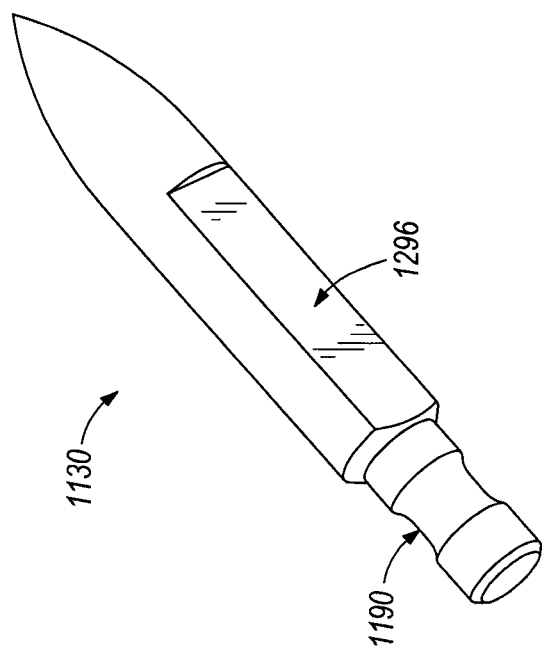
FIG. 32 is a second perspective view of the feed shaft of FIG. 31.

In some such embodiments, the feed shaft 230 can include a notch 290 and the locking member can be engageable in the notch 290 to secure the feed shaft 230 in the cutting tool body 212. In the illustrated embodiment of FIG. 18, the notch 290 extends around a portion of the circumference of the feed shaft 230. In other embodiments, the notch 290 can extend around the entire circumference of the feed shaft 230 (as shown in FIGS. 31 and 32, which are discussed in further detail below).

In some embodiments, the locking mechanism 276 can include a biasing member for biasing the locking member toward the locked position. In some such embodiments, the biasing member is supported in the channel adjacent to the locking member and is operable to bias the locking member through the channel toward the recess. In other embodiments, the biasing member can be supported on an exterior surface 292 of the drive shaft 224.

As shown in FIG. 18, the locking mechanism 276 can also include an actuator 280 for moving the locking member between the locked position and the unlocked position. In the illustrated embodiment of FIG. 18, the actuator 280 is supported on the exterior surface 292 of the drive shaft 224 for axial movement along the drive shaft 224 between a first or forward-most position (shown in FIG. 18) and a second or rearward-most position. In other embodiments, the actuator 280 is supported on the exterior surface 292 of the drive shaft 224 for circumferential (i.e., relative rotational) movement along the drive shaft 224 between the first position and the second position. In still other embodiments, the actuator 280 is supported on the exterior surface 292 of the drive shaft 224 for circumferential (i.e., relative rotational) movement along the drive shaft 224 and axial movement along the drive shaft 224.

The actuator 280 can also include a radially-inwardly extending protrusion. In this manner, when the actuator 280 is moved toward the first position, the protrusion is moved into radial alignment with the channel in the drive shaft 224 and into camming engagement with the locking member to move the locking member radially inwardly along the channel toward the locked position. When the actuator 280 is moved toward the second position, the protrusion is moved out of radial alignment with the channel in the drive shaft 224 and out of engagement with the locking member so that the locking member can move radially outwardly along the channel and toward the unlocked position. The actuator 280 can also include a biasing member for biasing the actuator 280 toward the first position, or alternatively, toward the second position.

Figure 19:
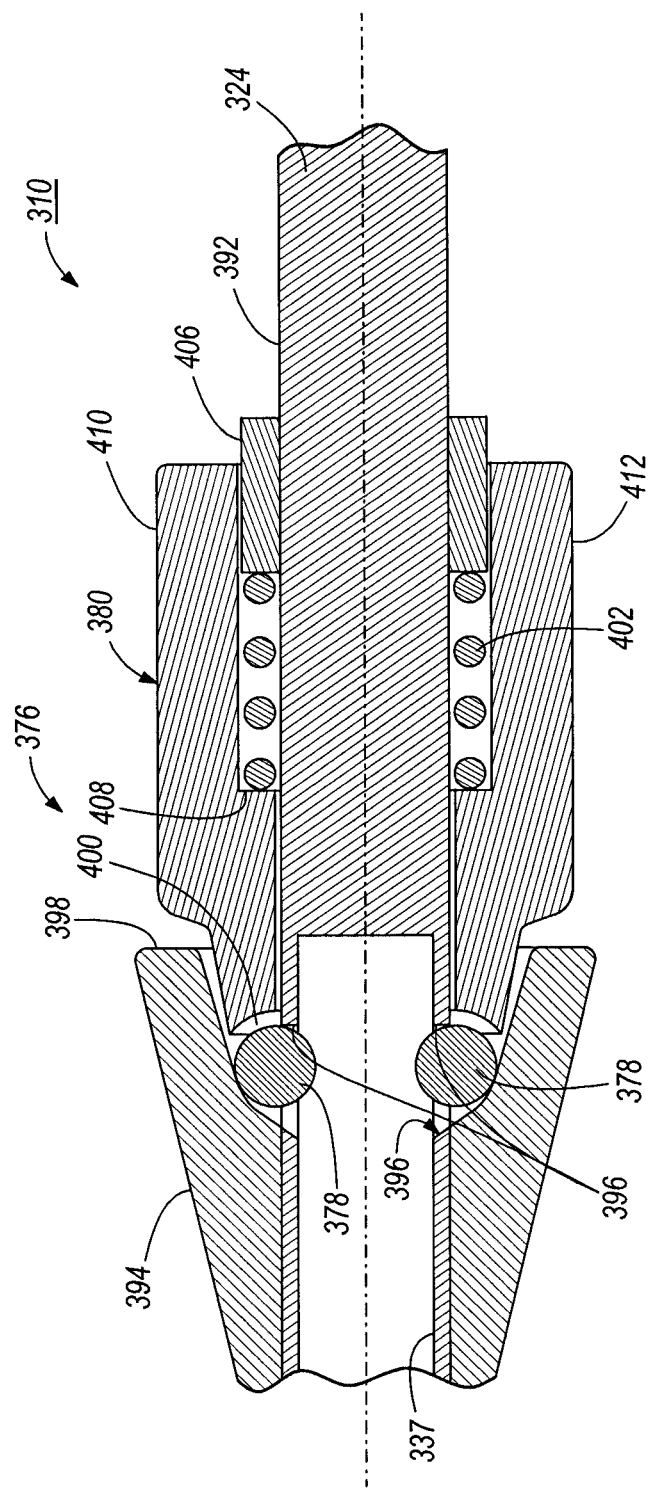
FIG. 19 is a cross-sectional view of another alternate embodiment of a portion of a cutting tool of the present invention.

FIG. 19 illustrates an alternate embodiment of a cutting tool 310 according to the present invention. The cutting tool 310 shown in FIG. 19 is similar in many ways to the illustrated embodiments of FIGS. 1-18 described above. Accordingly, with the exception of mutually inconsistent features and elements between the embodiment of FIG. 19 and the embodiments of FIGS. 1-18, reference is hereby made to the description above accompanying the embodiments of FIGS. 1-18 for a more complete description of the features and elements (and the alternatives to the features and elements) of the embodiment of FIG. 19. Features and elements in the embodiment of FIG. 19 corresponding to features and elements in the embodiments of FIGS. 1-18 are numbered in the 300 series.

In the illustrated embodiment of FIG. 19, the cutting tool 310 includes a locking mechanism 376 including a sleeve 394 supported on the exterior surface 392 of the drive shaft 324. Channels 396 extend radially through the drive shaft 324 and a portion of the sleeve 394. As shown in FIG. 19, a first end of each channel 396 opens into the recess 337 in the drive shaft 324 and a second end of each channel 396 opens axially toward a rear end 398 of the sleeve 394. Locking members 378 are supported in the channels 396 for movement between a locked position, in which the locking members 378 extend radially inwardly from the second end of the channel 396 and into the recess 337 to secure the feed shaft to the cutting tool body, and an unlocked position, in which the locking members 378 are movable along the channels 396 and out of the recess 337.

In the illustrated embodiment, the locking mechanism 376 includes two locking members 378 supported for movement along two channels 396. In other embodiments, the locking mechanism 376 can include one, three, or more locking members 378 supported for movement along one, three, or more channels 396.

As shown in FIG. 19, the locking mechanism 376 can include an actuator 380 supported on the exterior surface 392 of the drive shaft 324 for axial movement along the drive shaft 324 between a first or forward-most position (shown in FIG. 19) and a second or rearward-most position. In the illustrated embodiment of FIG. 19, the actuator 380 can also include a forwardly-extending protrusion 400.

In this manner, when the actuator 380 is moved toward the first position, the protrusion 400 is moved into camming engagement with each of the locking members 378 to move the locking members 378 forwardly and radially inwardly along the channels 396 toward the locked positions in the recess 337. When the actuator 380 is moved toward the second position, the locking members 378 can be moved radially outwardly along the channels 396 and away from the recess 337 so that the feed shaft can be removed from the cutting tool body.

In the illustrated embodiment of FIG. 19, the locking mechanism 376 also includes a biasing member 402 for biasing the actuator 380 toward the first position. As shown in FIG. 19, the biasing member 402 can be supported on the exterior surface 392 of the drive shaft 324 between a collar 406 and an interior shoulder 408 of the actuator 380.

As also shown in FIG. 19, a rearward portion 410 of the actuator 380 can extend rearwardly across the biasing member 402 to substantially enclose the biasing member 402 and to prevent debris from entering the locking mechanism 376.

In some embodiments, the outer surface 412 of the actuator 380 can be knurled and/or can include outwardly extending protrusions to provide a slip-resistant gripping surface. In these and other embodiments, the outer surface 412 of the actuator 380 or a portion of the outer surface 412 of the actuator 380 can include or be formed from an elastic material to provide a cushion grip.

Figure 20:
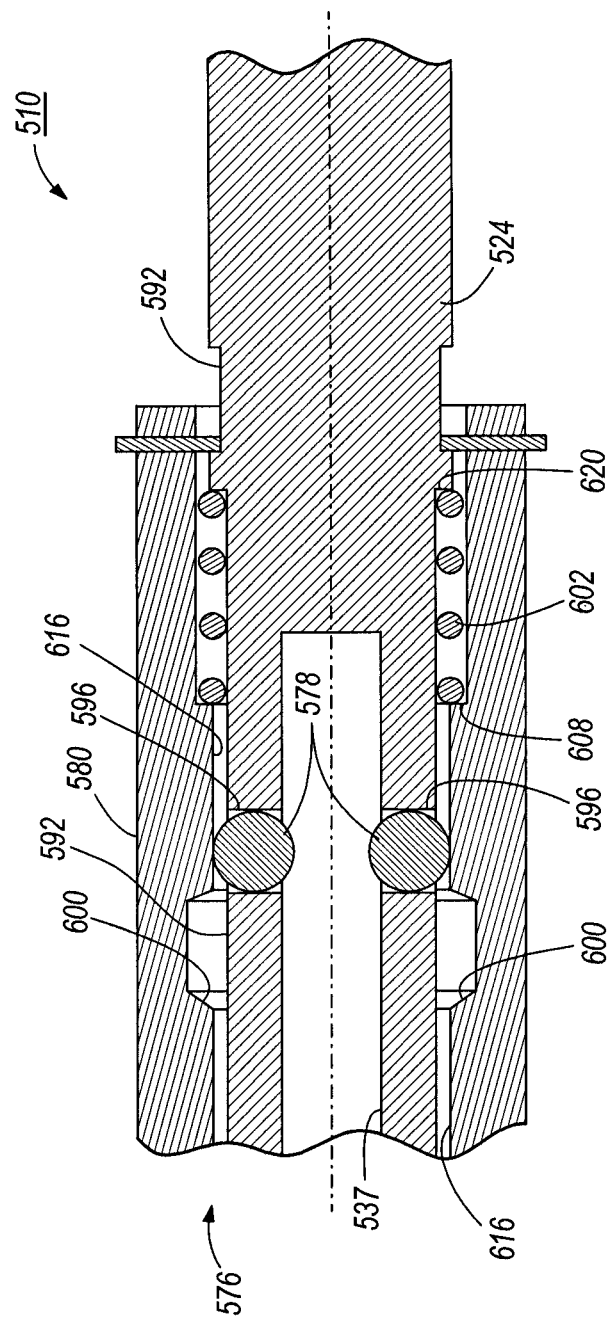
FIG. 20 is a cross-sectional view of another alternate embodiment of a portion of a cutting tool of the present invention.

FIG. 20 illustrates an alternate embodiment of a cutting tool 510 according to the present invention. The cutting tool 510 shown in FIG. 20 is similar in many ways to the illustrated embodiments of FIGS. 1-19 described above. Accordingly, with the exception of mutually inconsistent features and elements between the embodiment of FIG. 20 and the embodiments of FIGS. 1-19, reference is hereby made to the description above accompanying the embodiments of FIGS. 1-19 for a more complete description of the features and elements (and the alternatives to the features and elements) of the embodiment of FIG. 20. Features and elements in the embodiment of FIG. 20 corresponding to features and elements in the embodiments of FIGS. 1-19 are numbered in the 500 and 600 series.

In the illustrated embodiment of FIG. 20, the cutting tool 510 includes a locking mechanism 576 including an actuator 580 supported on the exterior surface 592 of the drive shaft 524. Channels 596 extend radially through the drive shaft 524. As shown in FIG. 20, locking members 578 are supported in the channels 596 for movement between a locked position, in which the locking members 578 extend radially inwardly into the recess 537 to secure the feed shaft to the cutting tool body, and an unlocked position, in which the locking members 578 are movable along the channels 596 and out of the recess 537.

As shown in FIG. 20, the locking mechanism 576 can include an actuator 580 supported on the exterior surface 592 of the drive shaft 524 for axial movement along the drive shaft 524 between a first or forward-most position (shown in FIG. 20) and a second or rearward-most position. In the illustrated embodiment of FIG. 20, the actuator 580 can also include a recess 600 extending circumferentially around an interior surface 616 of the actuator 580. In still other embodiments, the actuator 580 can also or alternatively include a recess 600 extending in a serpentine path or threaded around the drive shaft 524.

In this manner, when the actuator 580 is moved toward the first position, the interior surface 616 of the actuator 580 is moved into camming engagement with each of the locking members 578 to move the locking members 578 radially inwardly along the channels 596 toward the locked positions (shown in FIG. 20). When the actuator 580 is moved toward the second position, the recess 600 is moved into radial alignment with the channels 596 so that the locking members 578 can be moved radially outwardly along the channels 596 and away from the recess 537 so that the feed shaft can be removed from the cutting tool body.

In the illustrated embodiment of FIG. 20, the locking mechanism 576 also includes a biasing member 602 for biasing the actuator 580 toward the second position. As shown in FIG. 20, the biasing member 602 can be supported on the exterior surface 592 of the drive shaft 524 between an outwardly-extending shoulder 620 of the drive shaft 524 and an interior shoulder 608 of the actuator 580.

Figure 21:
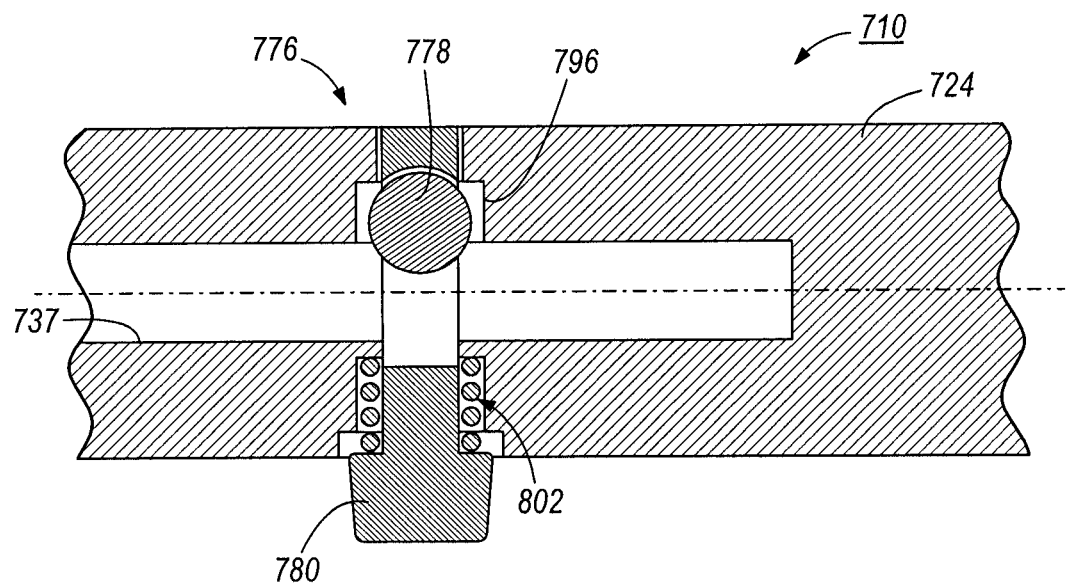
FIG. 21 is a cross-sectional view of another alternate embodiment of a portion of a cutting tool of the present invention.
Figure 22:
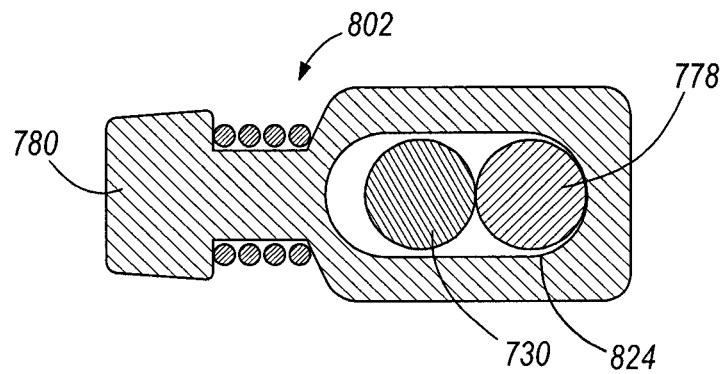
FIG. 22 is side view of a portion of the cutting tool shown in FIG. 21.

FIGS. 21 and 22 illustrate an alternate embodiment of a cutting tool 710 according to the present invention. The cutting tool 710 shown in FIGS. 21 and 22 is similar in many ways to the illustrated embodiments of FIGS. 1-21 described above. Accordingly, with the exception of mutually inconsistent features and elements between the embodiment of FIGS. 21 and 22 and the embodiments of FIGS. 1-20, reference is hereby made to the description above accompanying the embodiments of FIGS. 1-20 for a more complete description of the features and elements (and the alternatives to the features and elements) of the embodiment of FIGS. 21 and 22. Features and elements in the embodiment of FIGS. 21 and 22 corresponding to features and elements in the embodiments of FIGS. 1-20 are numbered in the 700 and 800 series.

In the illustrated embodiment of FIGS. 21 and 22, the cutting tool 710 includes a locking mechanism 776. A channel 796 extends radially through the drive shaft 724 and communicates with the recess 737 in the drive shaft 724. An actuator 780 is supported in the channel 796 for radial movement between a first position (shown in FIG. 21) and a second position. As shown in FIG. 22, the actuator 780 can include a slot 824 and can support a locking member 778 for movement along the channel 796 between a locked position, in which the locking member 778 extends radially inwardly into the recess 737 to secure the feed shaft 730 to the cutting tool body, and an unlocked position, in which the locking member 778 is movable along the channel 796 and out of the recess 737.

In the illustrated embodiment of FIGS. 21 and 22, the locking member 778 is supported for movement along the slot 824. In other embodiments, the locking member 778 can be integrally formed with the actuator 780 for movement with the actuator 780 between the first position and the second position.

When the actuator 780 of the illustrated embodiment of FIGS. 21 and 22 is moved along the channel 796 toward the first position, the locking member 778 is moved radially inwardly into the recess 737 to engage the feed shaft 730. When the actuator 780 is moved toward the second position, the locking member 778 is able to move radially outwardly along the channel 796 and out of the recess 737 toward the unlocked position. The actuator 780 can also include a biasing member 802 for biasing the actuator 780 toward the first position.

Figure 23:
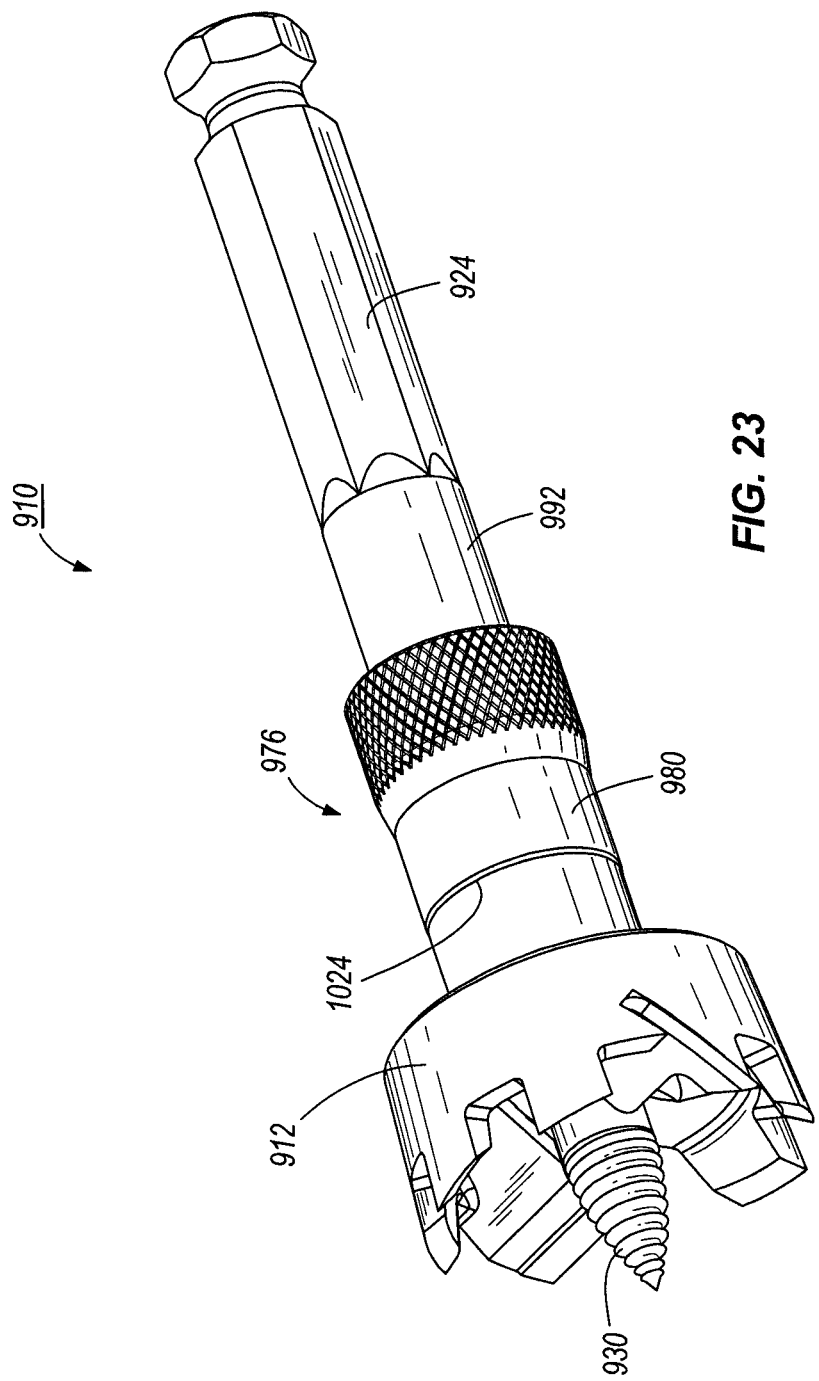
FIG. 23 is a perspective view of another alternate embodiment of a cutting tool of the present invention.
Figure 24:
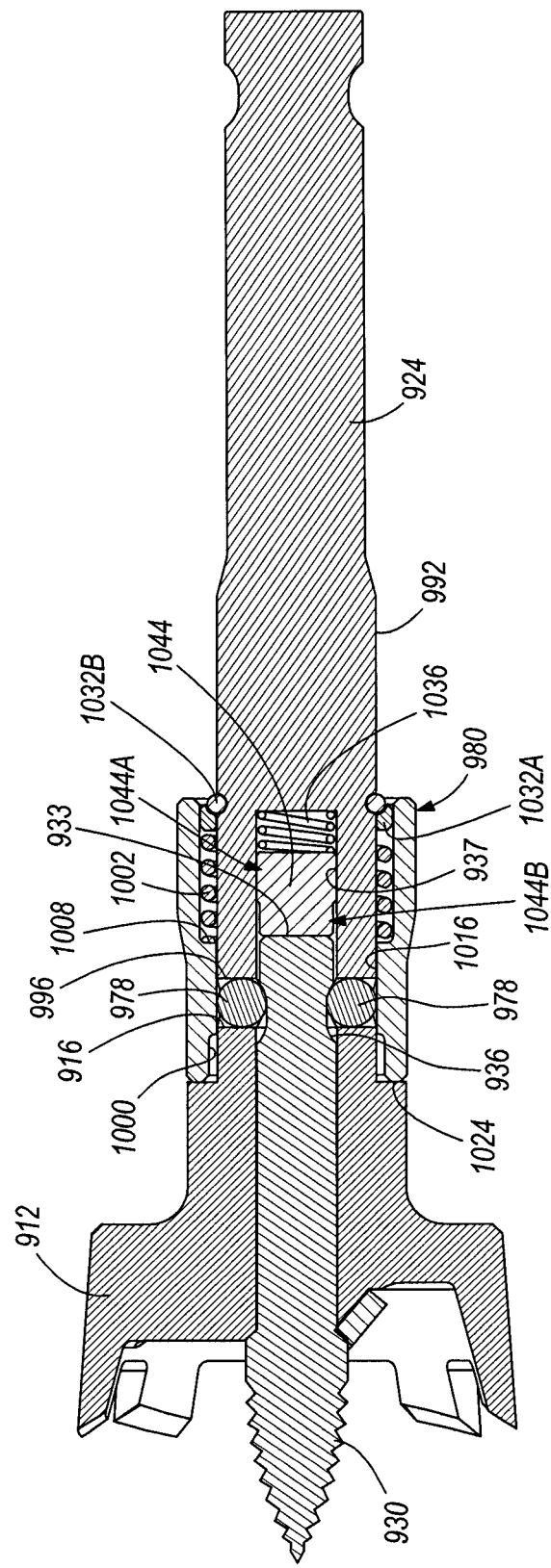
FIG. 24 is a cross-sectional view of the cutting tool shown in FIG. 23 with a locking mechanism in a locked position.
Figure 25:
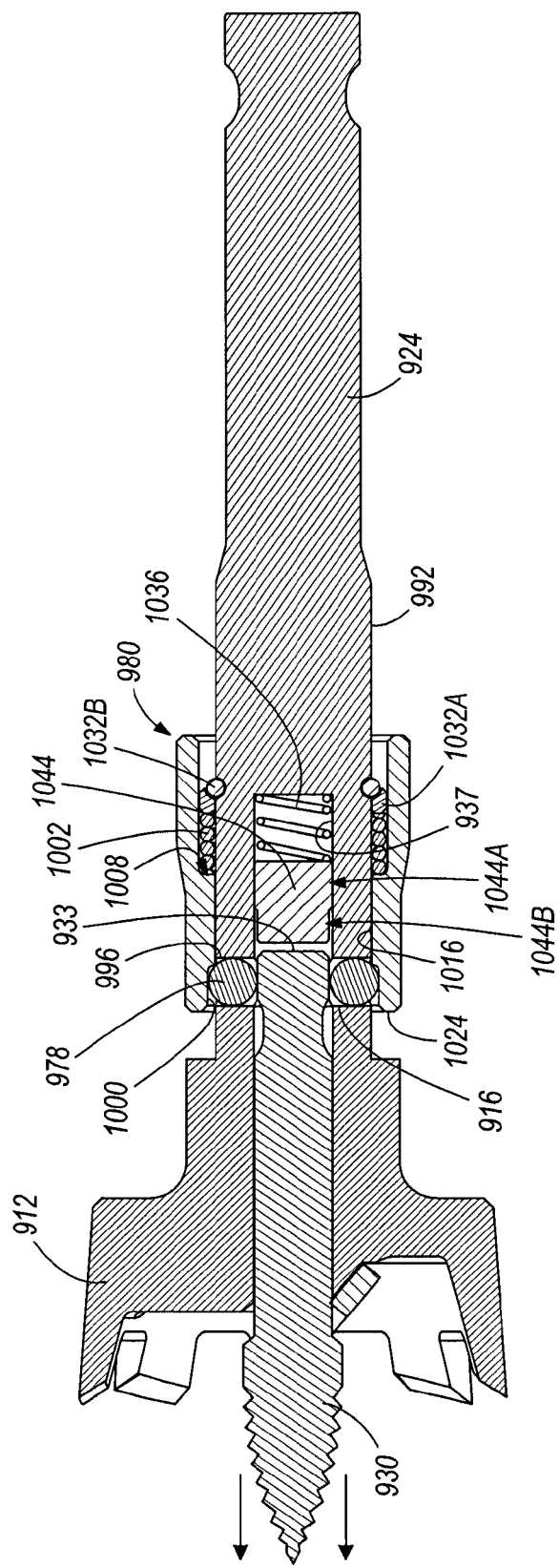
FIG. 25 is a second cross-sectional view of the cutting tool shown in FIG. 23 with the locking mechanism in an unlocked position.

FIGS. 23-25 illustrate an alternate embodiment of a cutting tool 910 according to the present invention. The cutting tool 910 shown in FIGS. 23-25 is similar in many ways to the illustrated embodiments of FIGS. 1-22 described above. Accordingly, with the exception of mutually inconsistent features and elements between the embodiment of FIGS. 23-25 and the embodiments of FIGS. 1-22, reference is hereby made to the description above accompanying the embodiments of FIGS. 1-22 for a more complete description of the features and elements (and the alternatives to the features and elements) of the embodiment of FIGS. 23-25. Features and elements in the embodiment of FIGS. 23-25 corresponding to features and elements in the embodiments of FIGS. 1-22 are numbered in the 900 and 1000 series.

In the illustrated embodiment of FIGS. 23-25, the cutting tool 910 includes a locking mechanism 976. The locking mechanism 976 can include locking members 978 and an actuator 980 supported on the exterior surface 992 of the drive shaft 924 for axial movement along the drive shaft 924 between a first or forward-most position (shown in FIG. 24) and a second or rearward-most position (shown in FIG. 25). In the illustrated embodiment of FIGS. 23-25, the actuator 980 can also include a recess 1000 extending circumferentially around an interior surface 1016 of the actuator 980 at its forward end 1024. In the illustrated embodiment of FIGS. 23-25, the recess 1000 extends to the forward end 1024 of the actuator 980.

Channels 996 are defined between the base 916 of the cutting tool body 912 and a forward end of the drive shaft 924. In the illustrated embodiment of FIGS. 23-25, two channels 996 are spaced around the circumference of the drive shaft 924 by about 180 degrees and extend radially through the exterior surface 992 of the drive shaft 924 and open into the recess 937. In other embodiments, the channels 996 can have other relative locations and orientations.

In this manner, when the actuator 980 is moved toward the first position, the interior surface 1016 of the actuator 980 is moved into camming engagement with each of the locking members 978 to move the locking members 978 radially inwardly along channels 996 toward the locked positions (shown in FIG. 24). When the actuator 980 is moved toward the second position, the recess 1000 is moved into radial alignment with the channels 996 so that the locking members 978 can be moved radially outwardly along the channels 996 and out of the recess 936 of the feed shaft 930 so that the feed shaft 930 can be removed from the cutting tool body 912.

In the illustrated embodiment of FIGS. 23-25, the locking mechanism 976 also includes a biasing member 1002 for biasing the actuator 980 toward the first position. As shown in FIGS. 24 and 25, the biasing member 1002 can be supported on the exterior surface 992 of the drive shaft 924 between an interior shoulder 1008 of the actuator 980 and a pair of retaining members 1032A and 1032B. In other embodiments, a single retaining member replaces the pair of retaining members 1032A and 1032B.

A second biasing member 1036 is positioned in the recess 937 of the drive shaft 924 that receives the feed shaft 930. A slug 1044 is positioned in the recess 937 adjacent to the second biasing member 1036. When the feed shaft 930 is inserted into the recess 937 and the locking mechanism 976 is moved into a locked position, the slug 1044 is contacted by the second end 933 of the feed shaft 930, and the second biasing member 1036 is compressed. When the locking mechanism 976 is unlocked, the second biasing member 1036 urges the feed shaft 930 out of the recess 937 and away from the drive shaft 924 so that the feed shaft 930 is released from the locking engagement with the locking members 978.

In some embodiments, the slug 1044 includes a base portion 1044A and an engaging portion 1044B. The base portion 1044A and the engaging portion 1044B may be integrally-formed or alternately, may be separately-formed and coupled together by any suitable means (e.g., adhesive, welded, threaded engagement, etc.). In the illustrated embodiment, the base portion 1044A has a larger outer profile than the engaging portion 1044B. As such, the base portion 1044A may engage the locking members 978 when the feed shaft 930 is released to retain the slug 1044 within the recess 937. Alternately, the slug 1044 may be retained by the second biasing member 1036, opposite ends of which can be connected to the base portion 1044A and to the recess 937.

In some embodiments, the slug 1044 can be magnetically connected to the feed shaft 930. In some such embodiments, the engaging portion 1044B can include or support a magnet operable to maintain the feed shaft 930 connected to the slug 1044 and to the drive shaft 924 after the feed shaft 930 has been released from the locking engagement of the locking members 978. To remove the feed shaft 930, a user can grasp the feed shaft 930 and decouple it from the engaging portion 1044B of the slug 1044.

Figure 26:
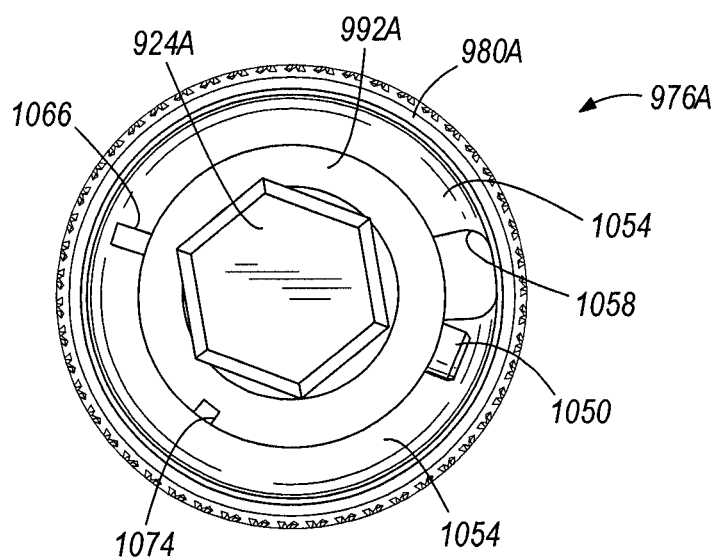
FIG. 26 is a rear view of an alternate locking mechanism for the cutting tool shown in FIG. 23.
Figure 27:
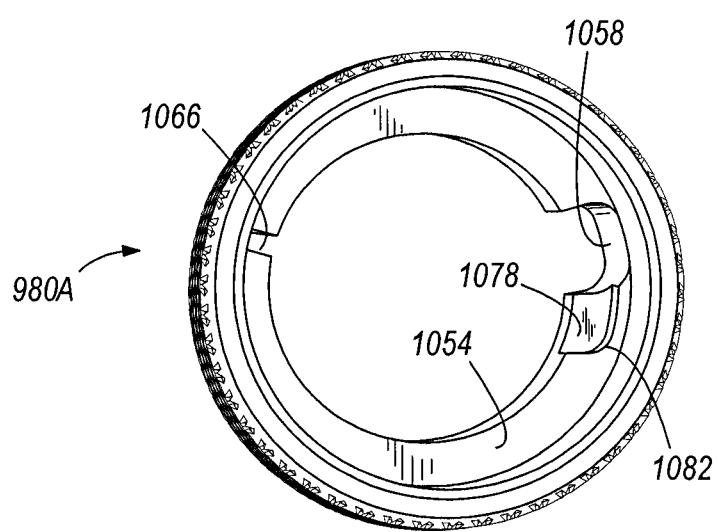
FIG. 27 is a perspective view of an actuator of the locking mechanism shown in FIG. 26.
Figure 28:
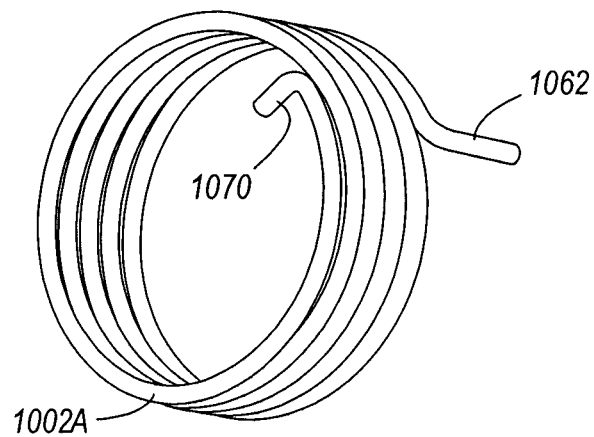
FIG. 28 is a perspective view of a biasing member of the locking mechanism shown in FIG. 26.

In some embodiments, the cutting tool 910 of FIG. 23 is provided with an alternate locking mechanism 976A as illustrated in FIGS. 26-28. The locking mechanism 976A is similar to the locking mechanism 976 shown in the figures and described above, except for the particular features described below. Additionally, the feed shaft 924A may include additional features as compared to the feed shaft 924 described above.

A pin 1050 extends radially outwardly from the exterior surface 992A of the drive shaft 924A and into the interior of the actuator 980A. As shown in FIGS. 26 and 27, the actuator 980A can include an interior ledge 1054 extending around a majority of the circumference of the actuator 980A. A gap or slot 1058 is provided in the interior ledge 1054 adjacent to the pin 1050. A biasing member 1002A (FIG. 28) is positioned within the actuator 980A and around the exterior surface 992A of the drive shaft 924A. The biasing member 1002A is omitted from FIG. 26 for the purpose of clarity. The biasing member 1002A includes a first end 1062 that engages a retaining slot 1066 in the actuator 980A and a second end 1070 that engages a recess 1074 (FIG. 26) in the exterior surface 992A of the drive shaft 924A.

The biasing member 1002A can provide a torsion biasing force to bias the actuator 980A toward the orientation shown in FIG. 26 relative to the drive shaft 924A. In this orientation, the slot 1058 is out of axial alignment with the pin 1050, and the actuator 980A cannot be axially moved from the first (forward) position to the second (rearward) position to unlock the locking mechanism 976A. In some embodiments, the biasing member 1002A additionally provides an axially biasing force to bias the actuator 980A toward the first position.

In order to move the actuator 980A from the first position toward the second position, the actuator 980A is rotated against the force of the biasing member 1002A and relative to the drive shaft 924A to axially align the slot 1058 with the pin 1050 and then the actuator 980A may be moved axially relative to the drive shaft 924A into the second position. In a similar manner to the locking mechanism 976 described above, the second position of the actuator 980A allows the feed shaft 930 to be released. In addition, the torsional biasing of the actuator 980A (counter-clockwise as viewed in FIG. 26) relative to the drive shaft 924A inhibits incidental unlocking of the locking mechanism 976A. For example, if at any time the actuator 980A contacts the workpiece or loose chips of the workpiece during operation, the actuator 980A will be prevented from being moved from the first position to the second position. In fact, due to the rotation of the cutting tool 910, contact with the workpiece further urges the actuator 980A torsionally in the same direction as the biasing member 1002A. A pocket 1078 (FIG. 27) in the interior ledge 1054 defines a shoulder 1082 that engages the pin 1050 and limits the rotational movement of the actuator 980A relative to the drive shaft 924A.

FIGS. 29-32 illustrate an alternate embodiment of a cutting tool 1110 according to the present invention. The cutting tool 1110 shown in FIGS. 29-32 is similar in many ways to the illustrated embodiments of FIGS. 1-28 described above. Accordingly, with the exception of mutually inconsistent features and elements between the embodiment of FIGS. 29-32 and the embodiments of FIGS. 1-28, reference is hereby made to the description above accompanying the embodiments of FIGS. 1-28 for a more complete description of the features and elements (and the alternatives to the features and elements) of the embodiment of FIGS. 29-32. Features and elements in the embodiment of FIGS. 29-32 corresponding to features and elements in the embodiments of FIGS. 1-28 are numbered in the 1100 and 1200 series.

Figure 29:
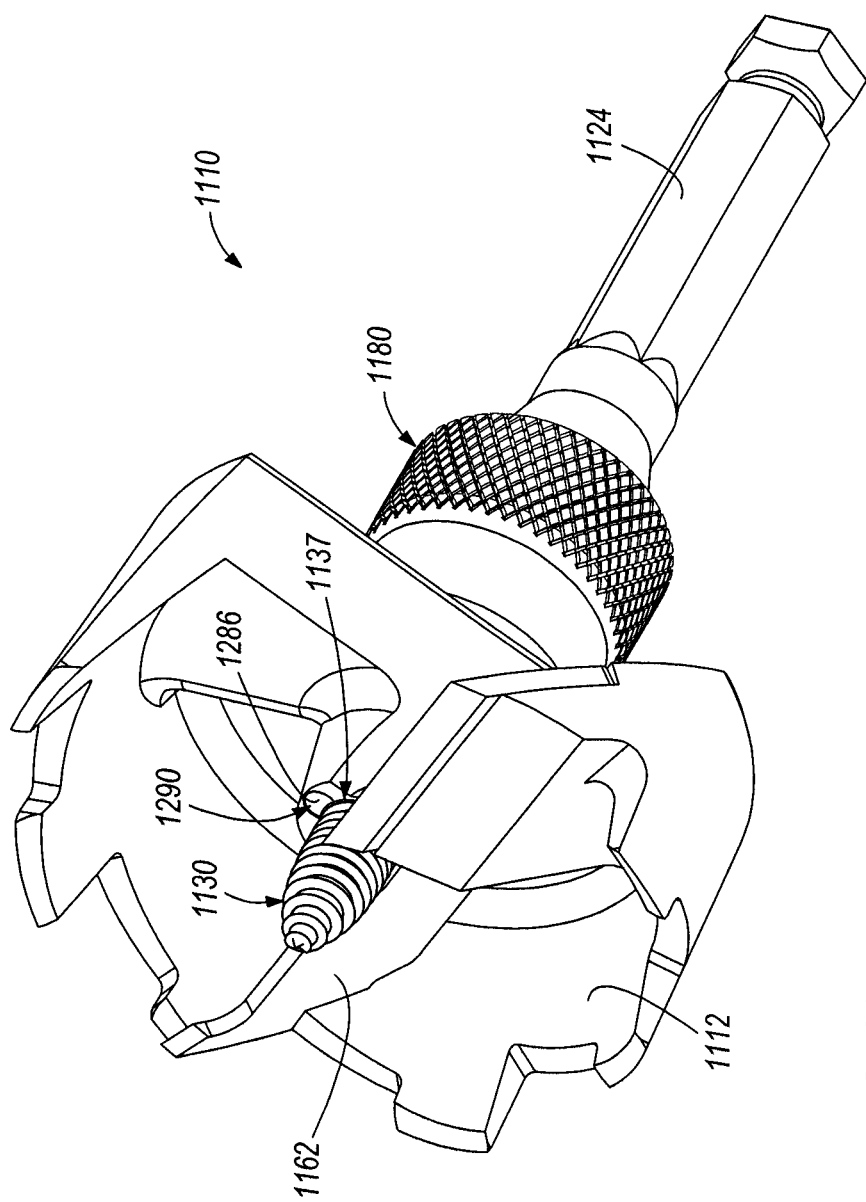
FIG. 29 is a perspective view of another alternate embodiment of a cutting tool of the present invention.
Figure 30:
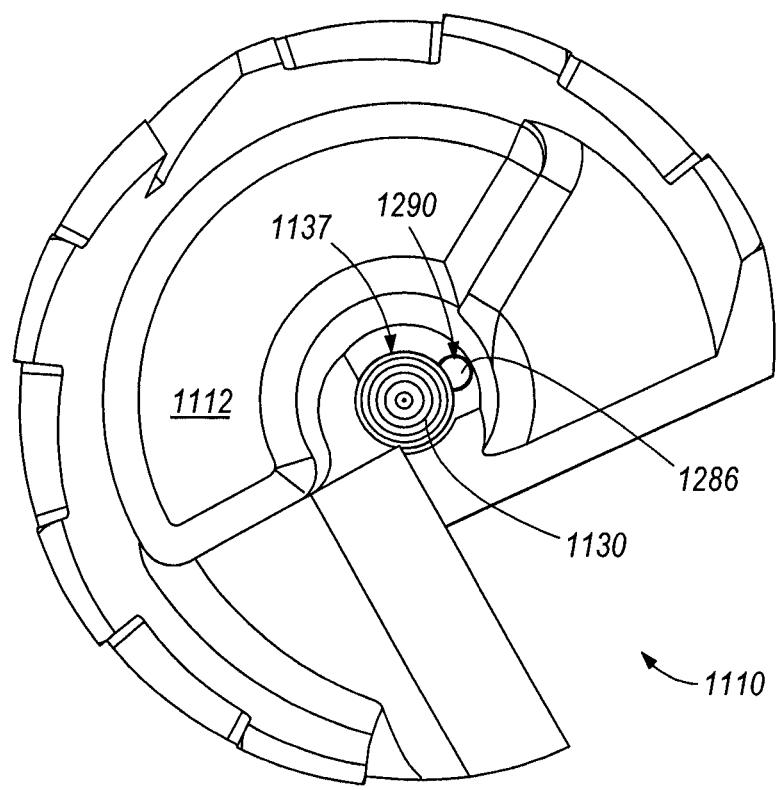
FIG. 30 is a front view of the cutting tool of FIG. 29.

As shown in FIGS. 29-32, the feed shaft 1130 is fixed against rotational movement relative to the cutting tool body 1112 by a key 1286 and keyway 1290, both of which have circular cross-sections in the illustrated embodiment, but each of which may alternately have a cross-sectional shape that is rectangular, polygonal, elliptical, etc. in other embodiments. The keyway 1290 can be a blind hole adjacent to and connecting with the recess 1137. In the illustrated embodiment, the keyway 1290 extends axially through the cutting tool body 1112 in a direction substantially parallel to the recess 1137. The keyway 1290 can be configured to receive the key 1286 therein. As shown in FIGS. 29 and 30, the key 1286 is a cylindrical pin having an outer diameter sized to closely and frictionally engage the wall of the keyway 1290. In some embodiments, key 1286 is sized to provide an interference fit with the keyway 1290.

The feed shaft 1130, as best shown in FIG. 31, may include an axially-extending keyway 1294 (e.g., slot, scallop, etc.) configured to receive the key 1286. In the illustrated embodiment, the keyway 1294 in the feed shaft 1130 is a rounded scallop shaped to receive the cylindrical-shaped key 1286. In other embodiments, the keyway 1294 may have another shape, depending on the shape of the key 1286.

FIG. 32 illustrates another side of the feed shaft 1130, which includes a flat 1296. The flat 1296 may provide clearance for the blade 1162 and/or an engagement surface for the same. FIGS. 31 and 32 illustrate a notch or annular groove 1190 that extends fully around a circumference of the feed shaft 1130 and is engageable by one or more locking members, as described above.

Figure 33:
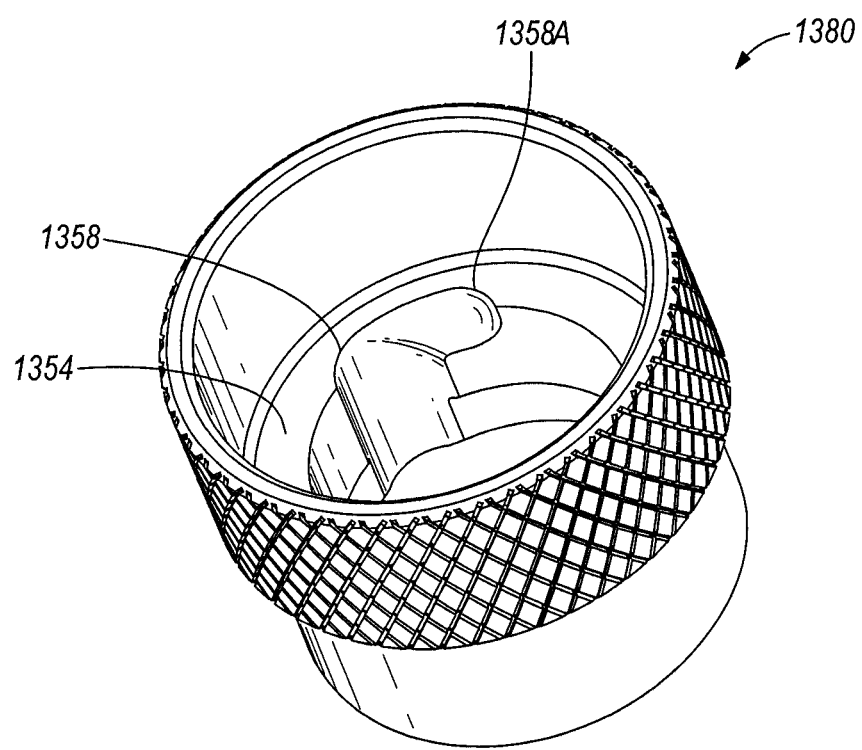
FIG. 33 is a perspective view of an actuator of a cutting tool of the present invention.

FIG. 33 illustrates an actuator 1380 similar to the actuator 980A illustrated in FIGS. 26 and 27 for use with a cutting tool similar to the cutting tool 910 illustrated in FIG. 23. The actuator 1380 of the illustrated embodiment of FIG. 33 is provided as part of an alternate embodiment of a locking mechanism similar to the locking mechanism 976A illustrated in FIGS. 26-28. The actuator 1380 and the associated locking mechanism (not shown in its entirety) are similar in structure and operation to the actuator 980A and its associated locking mechanism 976A, except as discussed in further detail below. Thus, for particular details of the cutting tool and locking mechanism structure and operation not given in relation to the actuator 1380 of FIG. 33, reference is hereby made to the description of the locking mechanism 976A.

The actuator 1380 includes an interior ledge 1354 extending around at least a majority of the circumference of the actuator 1380. A gap or slot 1358 is provided in the interior ledge 1354 to selectively receive a locking member (e.g., the pin 1050 of FIG. 26, a ball, or the like). A supplemental notch or cutaway 1358A is provided in the interior ledge 1354 to connect to the slot 1358. The supplemental notch 1358A has a substantially rounded profile. For this reason, the actuator 1380 of FIG. 33 is particularly well-suited for use with a locking mechanism in which a ball is substituted for the pin 1050 of FIG. 26. The supplemental notch 1358A provides a smooth transition along which the ball (not shown) can move into and out of the slot 1358 to move between locked and unlocked positions to enable operation similar to that described in detail above with respect to the locking mechanism 976A of FIG. 26.

Figure 34:
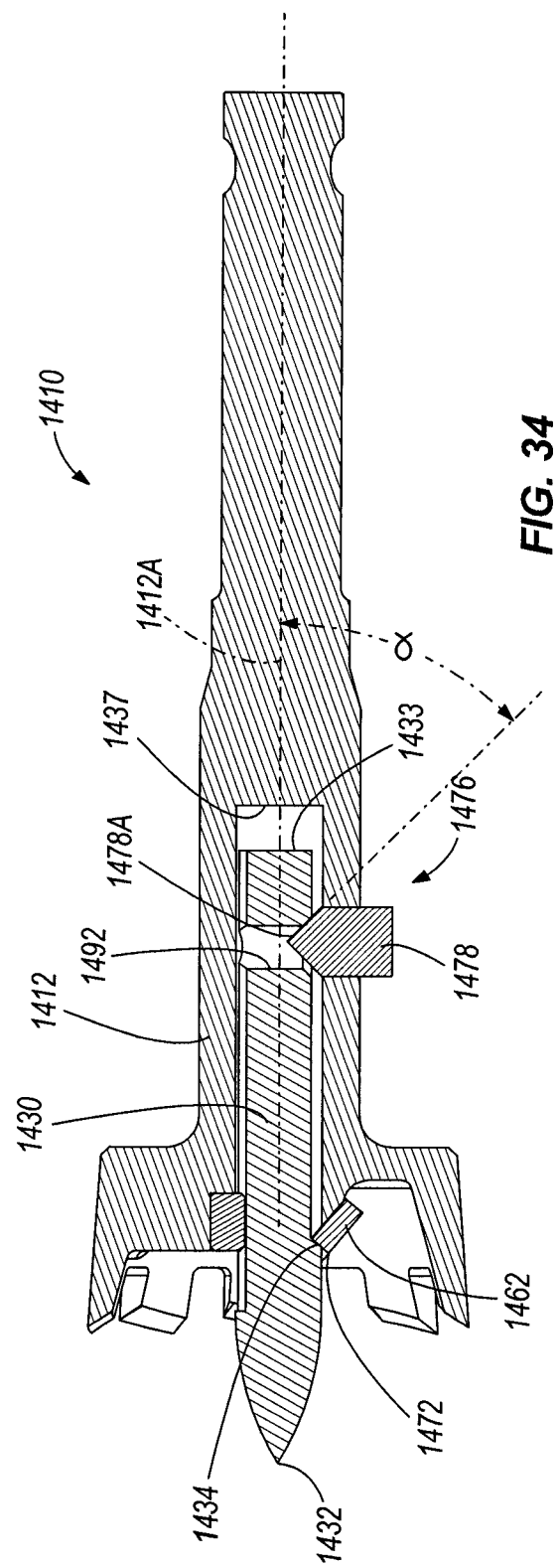
FIG. 34 is a section view of another embodiment of a cutting tool and a locking mechanism of the present invention.

FIG. 34 illustrates an alternate embodiment of a cutting tool 1410 according to the present invention. The cutting tool 1410 shown in FIG. 34 is similar in many ways to the illustrated embodiments of FIGS. 1-33 described above. Accordingly, with the exception of mutually inconsistent features and elements between the embodiment of FIG. 34 and the embodiments of FIGS. 1-33, reference is hereby made to the description above accompanying the embodiments of FIGS. 1-33 for a more complete description of the features and elements (and the alternatives to the features and elements) of the embodiment of FIG. 34. Features and elements in the embodiment of FIG. 34 corresponding to features and elements in the embodiments of FIGS. 1-33 are numbered in the 1400 series.

The cutting tool 1410 of FIG. 34 includes a locking mechanism 1476 for securing the removable blade 1462 in the body 1412 of the cutting tool 1410. The locking mechanism 1476 of FIG. 34 is operable to lock the feed shaft 1430 in place within the body 1412 of the cutting tool 1410 and also to provide a securing or tightening effect upon the blade 1462.

The feed shaft 1430 includes a ridge 1434 adjacent to the first end 1432 and a transverse opening 1492 adjacent to the second end 1433. The ridge 1434 is configured to abut the opening 1472 in the blade 1462 as shown in FIG. 34.

A locking member, such as a setscrew 1478 is configured to engage the body 1412 and the transverse opening 1492 in the feed shaft 1430. The setscrew 1478 is threadably engaged with the body 1412 so that the setscrew 1478 is incrementally adjustable into the depth of the transverse opening 1492. The illustrated setscrew 1478 includes a cone-shaped or angled tip 1478A, which engages the transverse opening 1492 on an edge farthest from the first end 1432 of the feed shaft 1430. As shown in FIG. 34, when the setscrew 1478 is supported in the body 1412, at least a portion of the tip 1478A can be oriented at an oblique angle with respect to an axis of the body 1412. In some embodiments, the tip 1478A can be oriented at an angle of between about 10 and about 80 degrees with respect to an axis 1412A of the body 1412 and an axis of the feed shaft 1430. In other embodiments, the tip 1478A can be oriented at an angle $\alpha$ of about 60 degrees with respect to the axis 1412A of the body 1412 and the axis of the feed shaft 1430. Thus, as the setscrew 1478 is advanced into the body 1412 and into the transverse opening 1492, the feed shaft 1430 is urged further into the recess 1437. This motion not only secures the feed shaft 1430 in the body 1412, but also provides a securing force to the blade 1462, which can make the cutting tool 1410 operate with greater precision and control.

Figure 35:
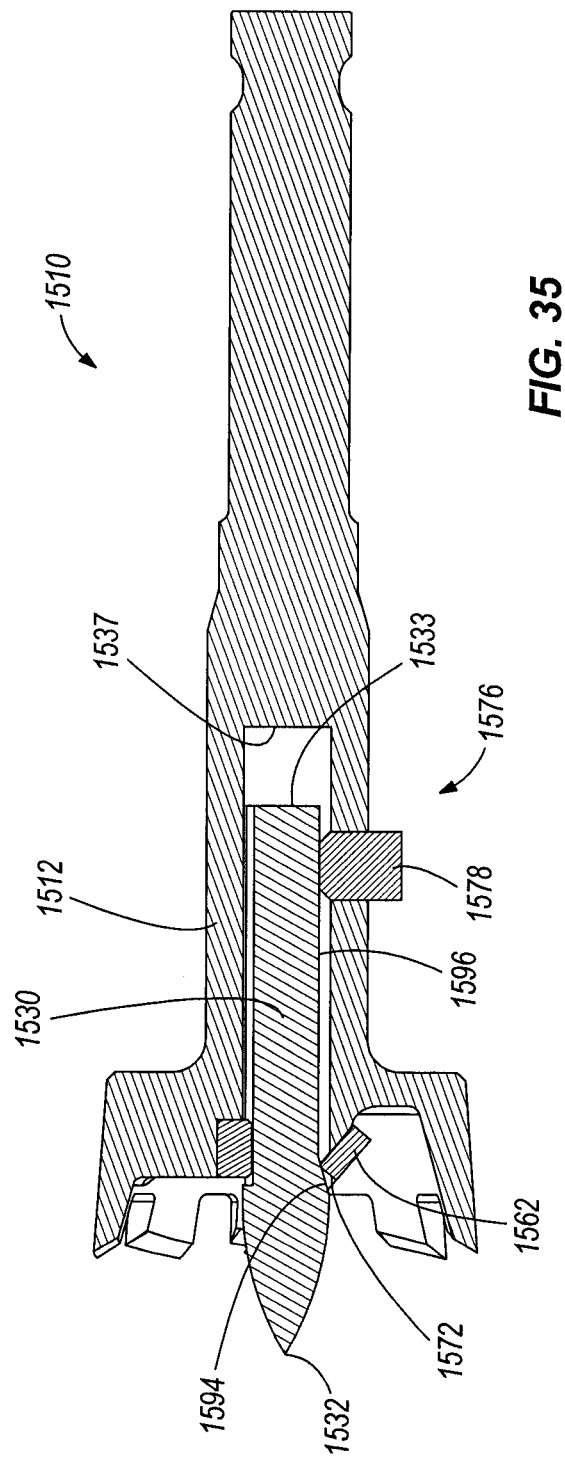
FIG. 35 is a section view of yet another embodiment of a cutting tool and a locking mechanism of the present invention.

FIG. 35 illustrates an alternate embodiment of a cutting tool 1510 according to the present invention. The cutting tool 1510 shown in FIG. 35 is similar in many ways to the illustrated embodiments of FIGS. 1-34 described above, and particularly to that of FIG. 34. Accordingly, with the exception of mutually inconsistent features and elements between the embodiment of FIG. 35 and the embodiments of FIGS. 1-34, reference is hereby made to the description above accompanying the embodiments of FIGS. 1-34 for a more complete description of the features and elements (and the alternatives to the features and elements) of the embodiment of FIG. 35. Features and elements in the embodiment of FIG. 35 corresponding to features and elements in the embodiments of FIGS. 1-34 are numbered in the 1500 series.

The cutting tool 1510 of FIG. 35 includes a locking mechanism 1576 for securing the removable blade 1562 in the body 1512 of the cutting tool 1510. The locking mechanism 1576 of FIG. 35 is operable to lock the feed shaft 1530 in place within the body 1512 of the cutting tool 1510 and also to provide a securing or tightening effect upon the blade 1562.

The feed shaft 1530 includes a flat side 1596 similar to the feed shaft 1130 of the illustrated embodiment of FIG. 32 and a smooth tapered shoulder 1594 just beyond the threads at the first end 1532. The tapered shoulder 1594 is configured to engage the opening 1572 in the blade 1562 as shown in FIG. 35. A locking member, such as a setscrew 1578 is configured to engage the body 1512 and the flat side 1596 of the feed shaft 1530. The setscrew 1578 is threadably engaged with the body 1512 so that the setscrew 1578 is incrementally adjustable into engagement with the feed shaft 1530 to apply a force to the flat side 1596 thereof. The illustrated setscrew 1578 can include a flat or cupped tip, but can have other shapes and configurations, such as for, example, angled, tapered, rounded, etc. As the setscrew 1578 is advanced into the body 1512 and into engagement with the feed shaft 1530 adjacent its second end 1533, the feed shaft 1530 is secured in position within the recess 1537. By applying an axial force to the feed shaft 1530 toward a back of the recess 1537 prior to tightening the setscrew 1578, the blade 1562 is securely wedged into position by the tapered shoulder 1594 in a direction substantially parallel to an axis of the body 1512 and in a direction substantially perpendicular to the axis of the body 1512. Subsequent tightening of the setscrew 1578 into engagement with the flat side 1596 of the feed shaft 1530 securely positions the blade 1562, which can make the cutting tool 1510 operate with greater precision and control.

Figure 36:
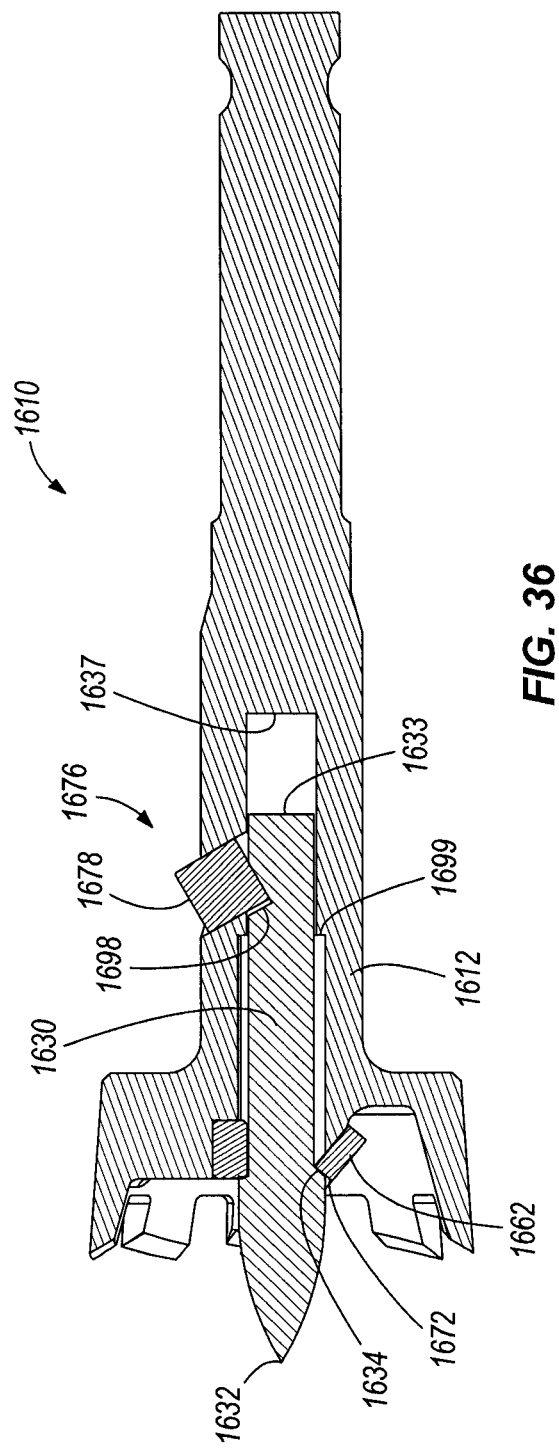
FIG. 36 is a section view of still another embodiment of a cutting tool and a locking mechanism of the present invention.

FIG. 36 illustrates an alternate embodiment of a cutting tool 1610 according to the present invention. The cutting tool 1610 shown in FIG. 36 is similar in many ways to the illustrated embodiments of FIGS. 1-35 described above, and particularly to that of FIGS. 34-35. Accordingly, with the exception of mutually inconsistent features and elements between the embodiment of FIG. 36 and the embodiments of FIGS. 1-35, reference is hereby made to the description above accompanying the embodiments of FIGS. 1-35 for a more complete description of the features and elements (and the alternatives to the features and elements) of the embodiment of FIG. 36. Features and elements in the embodiment of FIG. 36 corresponding to features and elements in the embodiments of FIGS. 1-35 are numbered in the 1600 series.

The cutting tool 1610 of FIG. 36 includes a locking mechanism 1676 for securing the removable blade 1662 in the body 1612 of the cutting tool 1610. The locking mechanism 1676 of FIG. 36 is operable to lock the feed shaft 1630 in place within the body 1612 of the cutting tool 1610 and also to provide a securing or tightening effect upon the blade 1662.

The feed shaft 1630 includes a ridge 1634 adjacent to the first end 1632 and an angled recess 1698 adjacent to the second end 1633. The ridge 1634 is configured to abut the opening 1672 in the blade 1662 as shown in FIG. 36. A locking member, such as a setscrew 1678 is configured to engage the body 1612 and the angled recess 1698 in the feed shaft 1630. The setscrew 1678 is threadably engaged with the body 1612 so that the setscrew 1678 is incrementally adjustable into the angled recess 1698, which is oriented at a non-perpendicular angle with respect to an axis of the body 1612. As the setscrew 1678 is advanced into the body 1612 and into engagement with the angled recess 1698, the feed shaft 1630 is urged further into the recess 1637 of the cutting tool body 1612. This motion not only secures the feed shaft 1630 in the body 1612, but also provides a securing force to the blade 1662, which can make the cutting tool 1610 operate with greater precision and control.

The recess 1637 is provided with a shoulder 1699 so that the second end 1633 of the feed shaft 1630 is received with relatively little diametric clearance. This limits undesirable sideways cocking of the feed shaft 1630 as the setscrew 1678 is tightened.

Figure 37:
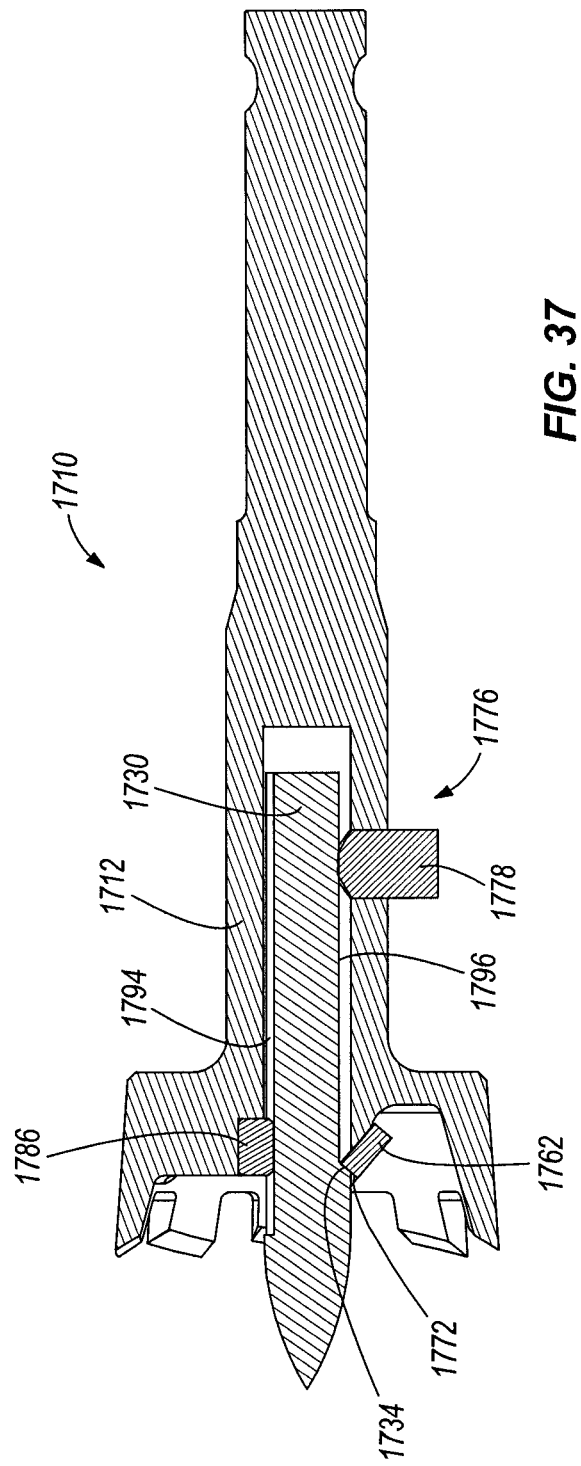
FIG. 37 is a section view of another embodiment of a cutting tool and a locking mechanism of the present invention.
Figure 38:
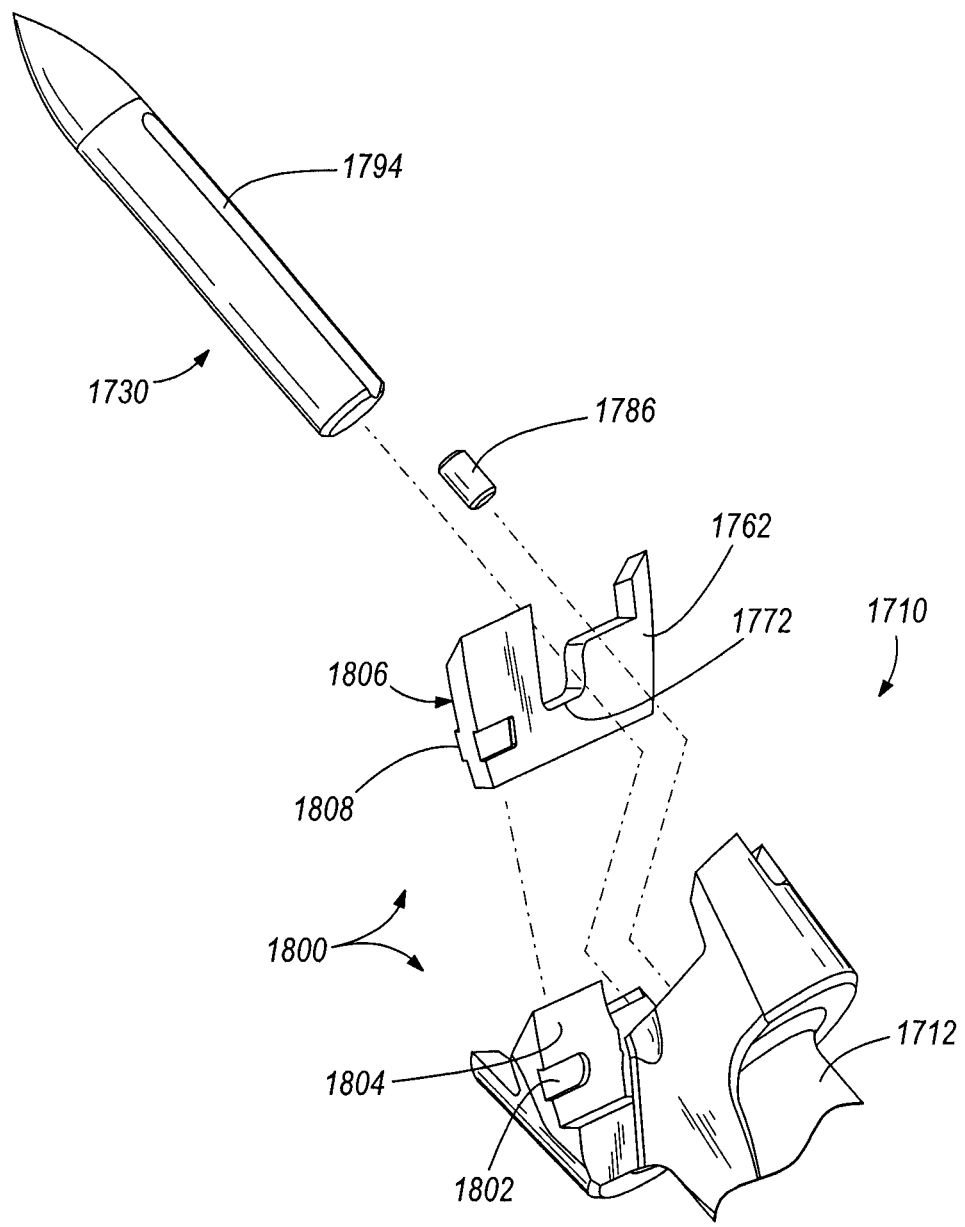
FIG. 38 is a perspective view of a cutting tool having a blade-to-tool engagement arrangement.

FIGS. 37-38 illustrate an alternate embodiment of a cutting tool 1710 according to the present invention. The cutting tool 1710 shown in FIGS. 37-38 is similar in many ways to the illustrated embodiments of FIGS. 1-36 described above. Accordingly, with the exception of mutually inconsistent features and elements between the embodiment of FIGS. 37-38 and the embodiments of FIGS. 1-36, reference is hereby made to the description above accompanying the embodiments of FIGS. 1-36 for a more complete description of the features and elements (and the alternatives to the features and elements) of the embodiment of FIGS. 37-38. Features and elements in the embodiment of FIG. 37-38 corresponding to features and elements in the embodiments of FIGS. 1-36 are numbered in the 1700 and 1800 series.

The cutting tool 1710 of FIGS. 37-38 includes a locking mechanism 1776 for securing the removable blade 1762 in the body 1712 of the cutting tool 1710. The locking mechanism 1776 of FIGS. 37-38 is configured to lock the feed shaft 1730 in place within the body 1712 of the cutting tool 1710.

The feed shaft 1730 can be similar to the feed shaft 1130 illustrated in FIGS. 29-32 and can include a keyway 1794 on one side and a flat 1796 terminating at a ridge 1734 on another side. A key 1786 fits into the tool body 1712 and into the keyway 1794 to rotationally position the feed shaft 1730 with respect to the body 1712. The ridge 1434 is configured to abut the opening 1772 in the blade 1762. A locking member, such as a setscrew 1778, is configured to engage the body 1712 and the flat 1796 on the feed shaft 1730. The setscrew 1778 is threadably engaged with the body 1712 so that the setscrew 1778 is incrementally adjustable into contact with the feed shaft 1730 and is perpendicular therewith. The setscrew 1778 can include a cupped tip 1778A, but other shapes and configurations, such as, for example, angled, tapered, rounded, etc. As the setscrew 1778 is advanced into the body 1712 and into engagement with the feed shaft 1730, the axial position of the feed shaft 1730 can be fixed. In other embodiments, the setscrew 1778 can also or alternatively be advanced into an opening extending into or through the feed shaft 1730 to secure the feed shaft 1730 to the body 1712.

In order to further secure the position of the blade 1762 with respect to the body 1712 and prevent undesirable movement of the blade 1762 with respect to the body 1712 during use of the cutting tool 1710 (i.e., to promote greater precision and control in the cutting operation), a blade locking arrangement 1800 is provided. The blade locking arrangement 1800 includes inter-engaging features on the blade 1762 and on the body 1712. The body 1712 includes a recess 1802 formed in a flat support surface 1804, which a corresponding support surface 1806 on the blade 1762 is configured to rest against when assembled. The blade 1762 is provided with a protrusion or boss 1808 extending from the support surface 1806 having a shape matching the recess 1802 and adapted to fit at least partially within the recess 1802 to restrain the blade 1762 from moving relative to the body 1712. In other embodiments, the body 1712 can include an outwardly extending boss or protrusion formed on the flat support surface 1804 and the blade 1762 can include a recess formed to matingly receive the protrusion pf the body 1712 so as to restrain the blade 1762 from moving relative to the body 1712.

Figure 39:
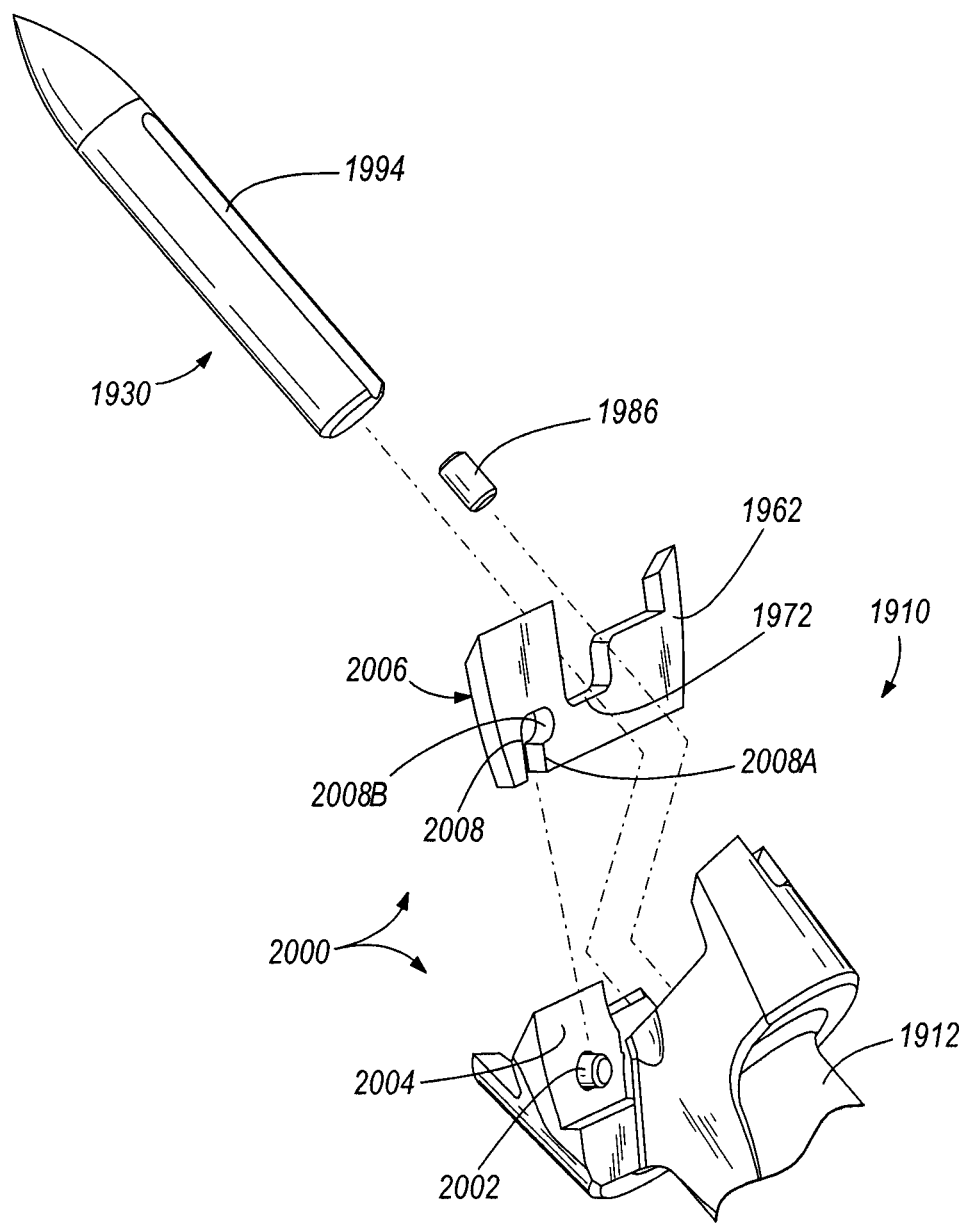
FIG. 39 is an exploded perspective view of a cutting tool having a blade-to-tool engagement arrangement according to an alternate embodiment.

FIG. 39 illustrates an alternate embodiment of a cutting tool 1910 according to the present invention. The cutting tool 1910 shown in FIG. 39 is similar in many ways to the illustrated embodiments of FIGS. 1-38 described above, and particularly to the illustrated embodiment of FIGS. 37-38. Accordingly, with the exception of mutually inconsistent features and elements between the embodiment of FIG. 39 and the embodiments of FIGS. 1-38, reference is hereby made to the description above accompanying the embodiments of FIGS. 1-38 for a more complete description of the features and elements (and the alternatives to the features and elements) of the embodiment of FIG. 39. Features and elements in the embodiment of FIG. 39 corresponding to features and elements in the embodiments of FIGS. 1-38 are numbered in the 1900 and 2000 series.

The cutting tool 1910 of FIG. 39 includes a blade locking arrangement for limiting the movement of the removable blade 1962 with respect to the body 1912 during operation of the cutting tool 1910. A locking mechanism (not shown) can be provided in accordance with one of the earlier embodiments to lock the feed shaft 1930 in place within the body 1912 of the cutting tool 1910. A locking member, the setscrew 1778 of FIG. 37 for example, can be used to engage the feed shaft 1930 and position the feed shaft 1930 axially.

In order to further secure the position of the blade 1962 with respect to the body 1912 and prevent undesirable movement of the blade 1962 with respect to the body 1912 during use of the cutting tool 1910, a blade locking arrangement 2000 is provided. The blade locking arrangement 2000 of the illustrated embodiment of FIG. 39 includes inter-engaging features on the blade 1962 and on the body 1912. The body 1912 includes a protrusion such as a boss or post 2002 formed in the flat support surface 2004 thereof. A corresponding support surface 2006 on the blade 1962 is configured to rest against the body support surface 2004 when assembled. The blade 1962 is provided with a recess such as a contoured notch or slot 2008. The post 2002 is adapted to fit at least partially within the slot 2008 to restrain the blade 1962 from moving relative to the body 1912. The blade locking arrangement 2000 can make the cutting tool 1910 operate with greater precision and control.

In the illustrated embodiment, the slot 2008 includes an entry portion 2008A and a terminal portion 2008B. During assembly, the post 2002 passes into the entry portion 2008A of the slot 2008 in the blade 1962 as the blade 1962 is inserted into the body 1912. The blade 1962 is subsequently moved perpendicular to the entry portion 2008A so that the post 2002 comes to rest at the end of the terminal portion 2008B of the slot 2008. When the blade 1962 is properly positioned, the feed shaft 1930 is inserted (engaging the opening 1972 in the blade 1962), and a locking mechanism according to one of the preceding embodiments is used to retain the feed shaft 1930 in the body 1912.

Figure 40:
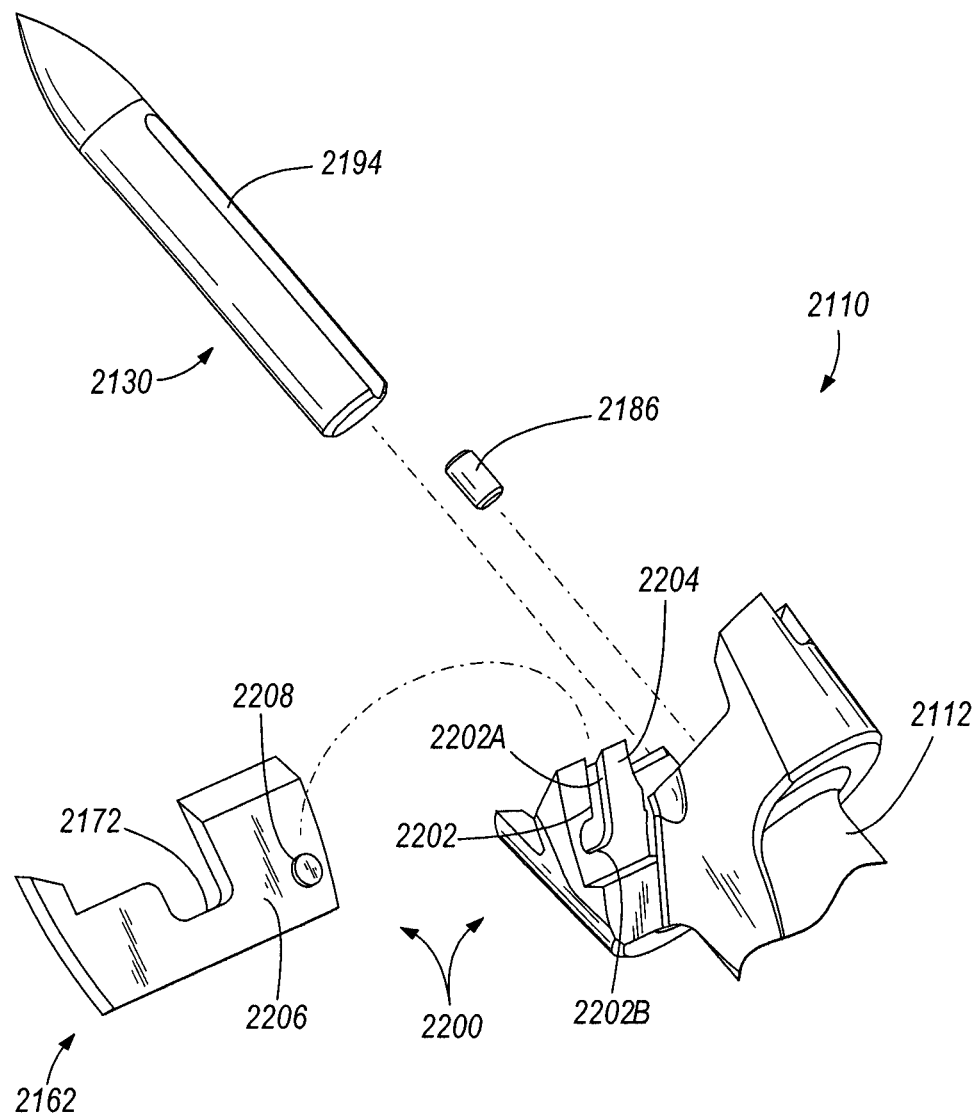
FIG. 40 is an exploded perspective view of a cutting tool having a blade-to-tool engagement arrangement according to yet another alternate embodiment.

FIG. 40 illustrates an alternate embodiment of a cutting tool 2110 according to the present invention. The cutting tool 2110 shown in FIG. 40 is similar in many ways to the illustrated embodiments of FIGS. 1-39 described above, and particularly to the illustrated embodiments of FIGS. 37-39. Accordingly, with the exception of mutually inconsistent features and elements between the embodiment of FIG. 40 and the embodiments of FIGS. 1-39, reference is hereby made to the description above accompanying the embodiments of FIGS. 1-39 for a more complete description of the features and elements (and the alternatives to the features and elements) of the embodiment of FIG. 40. Features and elements in the embodiment of FIG. 40 corresponding to features and elements in the embodiments of FIGS. 1-39 are numbered in the 2100 and 2200 series.

The cutting tool 2110 of FIG. 40 includes a blade locking arrangement 2200 for limiting the movement of the removable blade 2162 with respect to the body 2112 during operation of the cutting tool 2110. A locking mechanism (not shown) can be provided in accordance with one of the earlier embodiments to lock the feed shaft 2130 in place within the body 2112 of the cutting tool 2110. A locking member, the setscrew 1778 of FIG. 37 for example, can be used to engage the feed shaft 2130 and position the feed shaft 2130 axially.

In order to further secure the position of the blade 2162 with respect to the body 2112 and prevent undesirable movement of the blade 2162 with respect to the body 2112 during use of the cutting tool 2110, the blade locking arrangement 2200 is provided. The blade locking arrangement 2200 includes inter-engaging features on the blade 2162 and on the body 2112. The body 2112 includes a recess such as a contoured notch or slot 2202 formed in the support surface 2204 thereof. A corresponding support surface 2206 on the blade 2162 is configured to rest against the body support surface 2204 when assembled. The blade 2162 is provided with a protrusion such as a boss or post 2208. The post 2208 is adapted to fit at least partially within the slot 2202 to restrain the blade 2162 from moving relative to the body 2112. The blade locking arrangement 2200 can make the cutting tool 2110 operate with greater precision and control.

In the illustrated embodiment, the slot 2202 includes an entry portion 2202A and a terminal portion 2202B. During assembly, the post 2208 of the blade 2162 passes into the entry portion 2202A of the slot 2202 as the blade 2162 is inserted into the body 2112. The blade 2162 is subsequently moved perpendicular to the entry portion 2202A so that the post 2208 comes to rest at the end of the terminal portion 2202B of the slot 2202. When the blade 2162 is properly positioned, the feed shaft 2130 is inserted (engaging the opening 2172 in the blade 2162), and a locking mechanism according to one of the preceding embodiments is used to retain the feed shaft 2130 in the body 2112.

The embodiments described above and illustrated in the figures are presented by way of example only and are not intended as a limitation upon the concepts and principles of the present invention. Various features and advantages of the invention are set forth in the following claims.

What is claimed is:

1. An auger bit comprising:
a shaft having a central axis, a first passageway having a central axis which is angled at an acute angle relative to the central axis of the shaft, and a second passageway which is concentric with said central axis, the first passageway at least partially passing through the second passageway;
a cutting insert mounted to said shaft in said first passageway, the cutting insert including a first end and a second end, the second end positioned within the first passageway and positioned on one side of the shaft central axis, the first end including at least one cutting edge positioned on an opposite side of the shaft central axis from the second end;
a feed screw that is separate from the cutting insert, said feed screw mounted to said shaft in said second passageway, said cutting insert and said feed screw engaged with each other; and
a locking member securing the feed screw member to the shaft.

2. An auger bit as defined in claim 1, wherein said shaft includes a third passageway in which said locking member is mounted, said third passageway intersecting with said second passageway.

3. An auger bit as defined in claim 2, wherein said third passageway is perpendicular to said second passageway.

4. An auger bit as defined in claim 1, wherein said shaft includes a passageway which is smaller in dimension than said first passageway and which intersects with said first passageway.

5. An auger bit as defined in claim 1, wherein said feed screw has a shaft, and said cutting insert includes a groove, said shaft of said feed screw being positioned within said groove in said cutting insert.

6. An auger bit as defined in claim 5, wherein a plurality of cutting edges are formed on said first end, and the cutting insert having a central axis that forms a forty-five degree angle with said central axis of the shaft.

7. An auger bit as defined in claim 1, wherein said feed screw has a generally cylindrical shank, and a flat surface provided on said shank, said locking member engaging against said flat surface.

8. An auger bit as defined in claim 1, wherein said feed screw has a generally conically shaped threaded portion having a first end, a second end and a central axis defined therebetween, said first end having a diameter which is less than a diameter at said second end, a stem extending from said second end of said threaded portion, said stem having a first end, a second end and a central axis defined therebetween, said stem having a diameter that is less than the diameter of said threaded portion at said second end, and a flat surface that forms a depression within the stem and that forms an acute angle with the central axis of the stem, the depth of the depression lessening as the depression progresses away from the threaded portion.

9. A shaft for a cutting tool comprising:
a leading end and a trailing end, a shaft central axis extending between said leading end and said trailing end, a first passageway having a central axis angled relative to said shaft central axis, said first passageway having a diameter, and a second passageway having a central axis which is aligned with said central axis of said first passageway, said first passageway at least partially passing through said second passageway, the first passageway including a first end positioned on one side of the shaft central axis and a second end positioned on an opposite side of the shaft central axis from the first end, the first end of the first passageway positioned adjacent the leading end, said second passageway having a diameter which is smaller than said diameter of said first passageway.

10. A shaft as defined in claim 9, wherein said central axis of said first passageway forms an acute angle with the central axis of said shaft.

11. A shaft as defined in claim 9, further including a third passageway intersecting with said first passageway, said third passageway having a central axis aligned with said shaft central axis.

12. A shaft as defined in claim 11, further including a fourth passageway which intersects with said third passageway and is perpendicular to said shaft central axis.

13. An auger bit comprising:
a shaft having a central axis, a first passageway which has a central axis which is angled relative to the central axis of said shaft, a second passageway which is concentric with said central axis of said shaft, and a third passageway which is smaller in dimension than said first passageway and which intersects with said first passageway, the first passageway at least partially passing through the second passageway;
a cutting insert mounted to said shaft in said first passageway, the cutting insert including a first end and a second end, the second end positioned within the first passageway and positioned on one side of the shaft central axis, the first end including at least one cutting edge positioned on an opposite side of the shaft central axis from the second end;

a feed screw that is separate from the cutting insert, said feed screw mounted to said shaft in said second passageway, said cutting insert and said feed screw engaged with each other; and a locking member securing the feed screw member to the shaft.

14. An auger bit comprising:

a shaft having a central axis;

a cutting insert mounted to said shaft, said cutting insert includes a first end and a second end, cutting edges formed on said first end, and a groove having a central axis that forms a forty-five degree angle with said central axis of the shaft;

a feed screw having a shaft, said feed screw is separate from the cutting insert, said feed screw mounted to said shaft, said cutting insert and said feed screw engaged with each other such that said shaft of said feed screw is positioned within said groove in said cutting insert; and a locking member securing the feed screw member to the shaft.

* * * * *